(12) United States Patent
Ye et al.

(10) Patent No.: US 11,707,719 B2
(45) Date of Patent: Jul. 25, 2023

(54) FABRICATING STRUCTURED PARTICLES THROUGH RAPID HARDENING AND TAILORED COLLECTION METHODS

(71) Applicants: LAWRENCE LIVERMORE NATIONAL SECURITY, LLC, Livermore, CA (US); PURDUE RESEARCH FOUNDATION, West Lafayette, IN (US)

(72) Inventors: Congwang Ye, Livermore, CA (US); Roger D. Aines, Livermore, CA (US); Sarah E. Baker, Dublin, CA (US); Caitlyn Christian Cook, Livermore, CA (US); Eric B. Duoss, Dublin, CA (US); Joshua D. Kuntz, Livermore, CA (US); Elaine Lee, Brooklyn, NY (US); James S. Oakdale, Castro Valley, CA (US); Andrew J. Pascall, Livermore, CA (US); Joshuah K. Stolaroff, Oakland, CA (US); Marcus A. Worsley, Hayward, CA (US); Carlos J. Martinez, West Layfayette, IN (US)

(73) Assignees: Lawrence Livermore National Security, LLC, Livermore, CA (US); Purdue Research Foundation, West Layfayette, IN (US)

(*) Notice: Subject to any disclaimer, the term of this patent is extended or adjusted under 35 U.S.C. 154(b) by 1 day.

(21) Appl. No.: 17/450,731

(22) Filed: Oct. 13, 2021

(65) Prior Publication Data

US 2022/0023813 A1 Jan. 27, 2022

Related U.S. Application Data

(62) Division of application No. 15/928,522, filed on Mar. 22, 2018, now Pat. No. 11,173,461.

(51) Int. Cl.
*B01J 2/04* (2006.01)
*B01J 13/14* (2006.01)
*B01J 2/18* (2006.01)

(52) U.S. Cl.
CPC .. *B01J 2/04* (2013.01); *B01J 2/18* (2013.01); *B01J 13/14* (2013.01)

(58) Field of Classification Search
CPC ....... B01J 2/04; B01J 2/18; B01J 13/04; B01J 13/14; B01J 13/16; B01J 13/18; B01J 13/185; B01J 13/206; A61K 9/5089
See application file for complete search history.

(56) References Cited

U.S. PATENT DOCUMENTS 4,623,706 A * 11/1986 Timm .................. B01J 2/04
526/918
4,929,400 A * 5/1990 Rembaum ............ B29B 9/10
264/9

(Continued)

OTHER PUBLICATIONS

Dubey et al., "Microencapsulation Technology and Applications," Defense Science Journal, vol. 59, No. 1, 2009, pp. 82-95.

*Primary Examiner* — Mary Lynn F Theisen
(74) *Attorney, Agent, or Firm* — Eddie E. Scott

(57) ABSTRACT

Fabrication of functional polymer-based particles by crosslinking UV-curable polymer drops in mid-air and collecting crosslinked particles in a solid container, a liquid suspension, or an air flow. The particles can contain different phases in the form or layered structures that contain one to multiple cores, or structures that are blended with dissolved or emulsified smaller domains. A curing system produces ultraviolet rays that are directed onto the particles in the jet stream from one side. A reflector positioned on other side of the jet stream reflects the ultraviolet rays back onto the particles in the jet stream.

10 Claims, 15 Drawing Sheets

(56) References Cited

U.S. PATENT DOCUMENTS

| | | | | |
|---|---|---|---|---|
| 5,484,721 | A * | 1/1996 | Ors | B01J 2/08 |
| | | | | 426/11 |
| 6,579,479 | B1 * | 6/2003 | Edie | B22F 1/065 |
| | | | | 75/340 |
| 6,599,627 | B2 | 7/2003 | Yeo et al. | |
| 8,945,279 | B2 | 2/2015 | Aines et al. | |
| 11,173,461 | B2 | 11/2021 | Ye et al. | |
| 2002/0054912 | A1 | 5/2002 | Kim et al. | |
| 2006/0071357 | A1 | 4/2006 | Pilon et al. | |
| 2010/0283166 | A1 | 11/2010 | Hauser | |
| 2012/0128978 | A1 * | 5/2012 | Ballweg | B01J 13/04 |
| | | | | 428/394 |
| 2016/0280607 | A1 | 9/2016 | Land et al. | |

\* cited by examiner

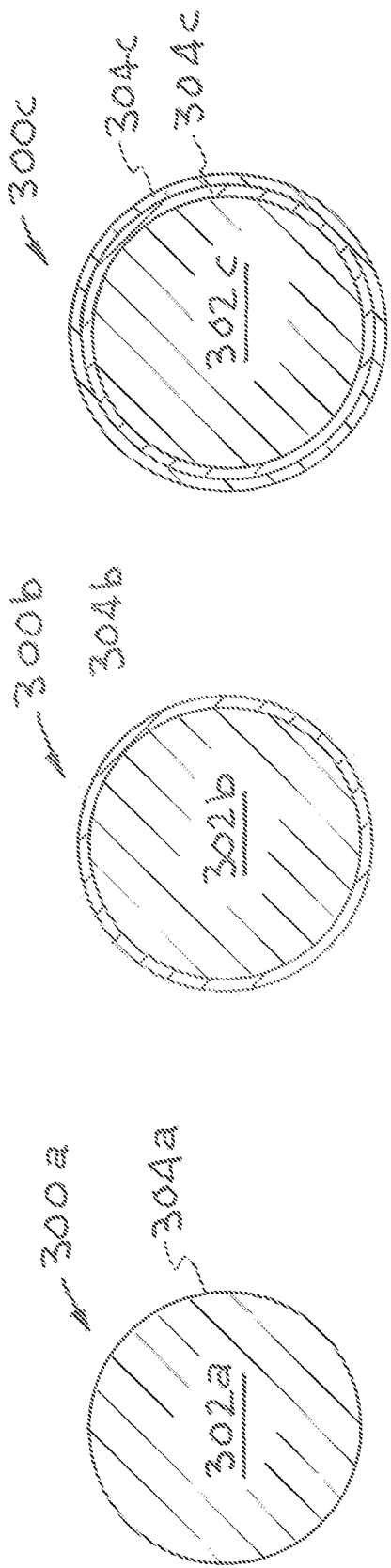
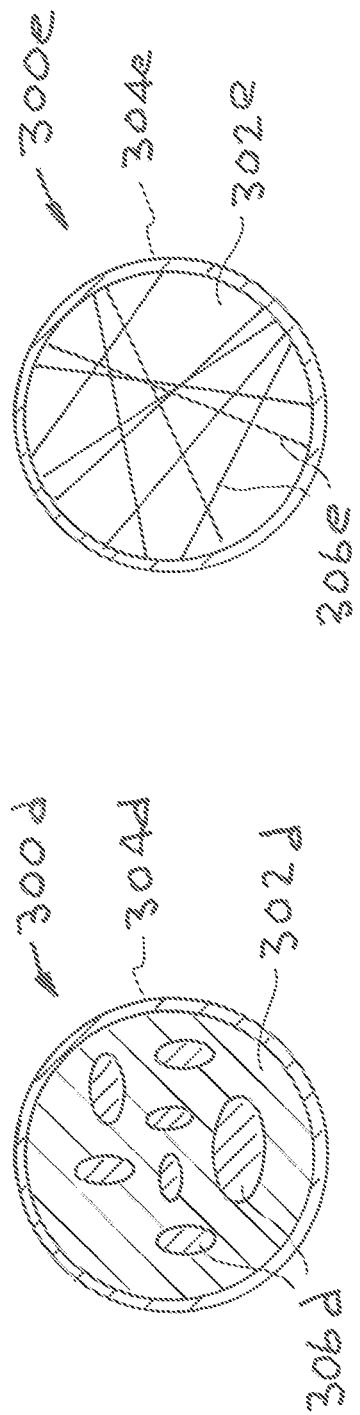
FIG. 3A
FIG. 3B
FIG. 3C
FIG. 3D
FIG. 3E

FABRICATING STRUCTURED PARTICLES THROUGH RAPID HARDENING AND TAILORED COLLECTION METHODS

CROSS-REFERENCE TO RELATED APPLICATIONS

The present application is a Division of application Ser. No. 15/928,522 filed Mar. 22, 2018 entitled "FABRICATING STRUCTURED PARTICLES THROUGH RAPID HARDENING AND TAILORED COLLECTION METHODS," the disclosure of which is hereby incorporated by reference in its entirety for all purposes.

AND STATEMENT AS TO RIGHTS TO APPLICATIONS MADE UNDER AND FEDERALLY SPONSORED RESEARCH DEVELOPMENT

The This invention was made with Government support under Contract No. DE-AC52-07NA27344 awarded by the United States Department of Energy. The Government has certain rights in the invention.

BACKGROUND

Field of Endeavor

The present application relates to fabricating structured particles and more particularly to fabricating structured particles through rapid hardening and tailored collection.

State of Technology

This section provides background information related to the present disclosure which is not necessarily prior art.

United States Published Patent Applications No. 2002/0054912 provides the state of technology information reproduced below.

Rapid advances in biotechnology have led to the discovery of numerous protein and peptide therapeutics, many of which have recently reached the marketplace or are currently under regulatory review by the United States Food and Drug Administration. Unlike traditional small-molecule drugs, however, proteins and peptides generally cannot be administered orally; injection or infusion is most often required. Further, because of their fragility and short in vivo half-lives, encapsulation of proteins in biodegradable polymeric devices, from which the drug can be delivered, locally or systemically, for a prolonged period of time, has been a promising and intensely studied solution to these problems. Biodegradable microspheres comprising a variety of polymers have been the most studied devices due to relatively simple fabrication and facile administration to a variety of locations in vivo through a syringe needle.

Several methodologies for microsphere fabrication have been described, including precipitation, spraying, phase separation, and emulsion techniques. The emulsion and spraying approaches have been commonly used both at the bench and industrial scales. Sphere size and size distribution are reproducible but often poorly controllable. Standard deviations equal to 25-50% of the mean diameter are not uncommon.

Control of sphere size and size distribution has several important implications for controlled-release drug delivery. For example, there typically is an ideal sphere size that provides a desired release rate and route of administration. Spheres that are "too small" exhibit poor encapsulation efficiency, may migrate from the site of injection, and may exhibit undesirably rapid release of their payload. Spheres that are "too large" may not easily pass through a syringe needle. Thus, the typically polydisperse spheres generated by conventional fabrication techniques must be filtered or sieved to isolate particles within the desired size range, and the polymer and drug composing spheres outside that range are wasted.

Uniform microspheres approximately 1-5 .mu.m in diameter would be ideal for passive targeting of professional antigen-presenting cells (APCs) such as macrophages and dendritic cells. Similarly, microspheres 10-20 .mu.m in diameter could be used to target the tortuous capillary bed of tumor tissues by chemoembolization. A system capable of precise microsphere fabrication could allow the optimal size for such applications to be identified and provide an efficient route to commercial manufacture and clinical implementation.

A long-sought goal for controlled-release drug delivery technologies is the ability to precisely control the release rate of encapsulated compounds, and microsphere size is a major determinant of release kinetics. Larger spheres generally release encapsulated compounds more slowly and over longer time periods, other properties (polymer molecular weight, initial porosity, drug distribution within the sphere, etc.) being equal. A constant (i.e., zero-order) release rate is often preferred, while variable drug release rates can be beneficial for many important indications. For example, intermittent high doses of antibiotics may alleviate evolution of resistance in bacteria, and discontinuous administration of vaccines often enhances the immune response.

U.S. Pat. No. 8,945,279 provides the state of technology information reproduced below.

The present invention removes the precipitation limitation of the prior art by incorporating the liquid sorbent in a thin polymer shell, forming a liquid filled bead typically 100 um to 1 mm in diameter. This bead now is a self-contained system that can tolerate precipitation of solids during the loading phase, and that presents a uniform physical presence during the regeneration (e.g. steam stripping) phase. In this way the carrying capacity and efficiency of the incorporated liquid solvents can be increased by 25% or more.

The present invention provides a system for carbon dioxide capture from flue gas and other industrial gas sources. The present invention utilizes microcapsules with very thin polymer shells. The contents of the microcapsules can be liquids or mixtures of liquids and solids. The microcapsules are exposed to the flue gas and other industrial gas and take up carbon dioxide from the flue gas and other industrial gas and eventual precipitate solids in the capsule. In one embodiment a process is used to recover the carbon dioxide in pure form by heating the capsules to temperatures of 70 to 200 C causing the carbon dioxide to vaporize and leave the microcapsules. Other embodiments utilize chemical changes or changes in the applied pressure. The present invention has use in carbon dioxide capture from flue gas, industrial gaseous effluents, aqueous solutions, solvents, and air.

SUMMARY

Features and advantages of the disclosed apparatus, systems, and methods will become apparent from the following description. Applicant is providing this description, which includes drawings and examples of specific embodiments, to give a broad representation of the apparatus, systems, and methods. Various changes and modifications within the spirit and scope of the application will become apparent to those skilled in the art from this description and by practice of the apparatus, systems, and methods. The scope of the apparatus, systems, and methods is not intended to be limited to the particular forms disclosed and the application covers all modifications, equivalents, and alternatives falling within the spirit and scope of the apparatus, systems, and methods as defined by the claims.

The inventor's disclosed apparatus, systems, and methods provide the fabrication of structured particles through rapid hardening and tailored collection. The term "structured particles" as used in this application means discrete droplets. The inventor's system provides the fabrication of functional polymer-based particles by crosslinking UV-curable polymer drops in mid-air and collecting crosslinked particles in a solid container, a liquid suspension, or an air flow. The particles can contain different phases in the form or layered structures that contain one to multiple cores, or structures that are blended with dissolved or emulsified smaller domains. Particles can be spherical, oval-shaped or irregularly shaped with a size range of 1-10 mm. Hardening of the particles is achieved by crosslinking the polymer precursor drop, which are generated by co-axial nozzles, with UV when the drops travel through the exposure window. Particles can also be obtained through thermal setting and solvent extraction after collection. Crosslinked particles will be gathered with different collection methods depending on their properties. The inventor's disclosed apparatus, systems, and methods have use for carbon capture, display material, chemical sensing, bio reaction, enzyme scaffold, and other applications that uses functional particles/capsules.

The apparatus, systems, and methods are susceptible to modifications and alternative forms. Specific embodiments are shown by way of example. It is to be understood that the apparatus, systems, and methods are not limited to the particular forms disclosed. The apparatus, systems, and methods cover all modifications, equivalents, and alternatives falling within the spirit and scope of the application as defined by the claims.

BRIEF DESCRIPTION OF THE DRAWINGS

The accompanying drawings, which are incorporated into and constitute a part of the specification, illustrate specific embodiments of the apparatus, systems, and methods and, together with the general description given above, and the detailed description of the specific embodiments, serve to explain the principles of the apparatus, systems, and methods.

FIGS. 3A-3E illustrate a number of examples of droplets that are produced by the inventor's system for fabricating structured particles through rapid hardening and tailored collection.

DETAILED DESCRIPTION OF SPECIFIC EMBODIMENTS

Figure 1A:
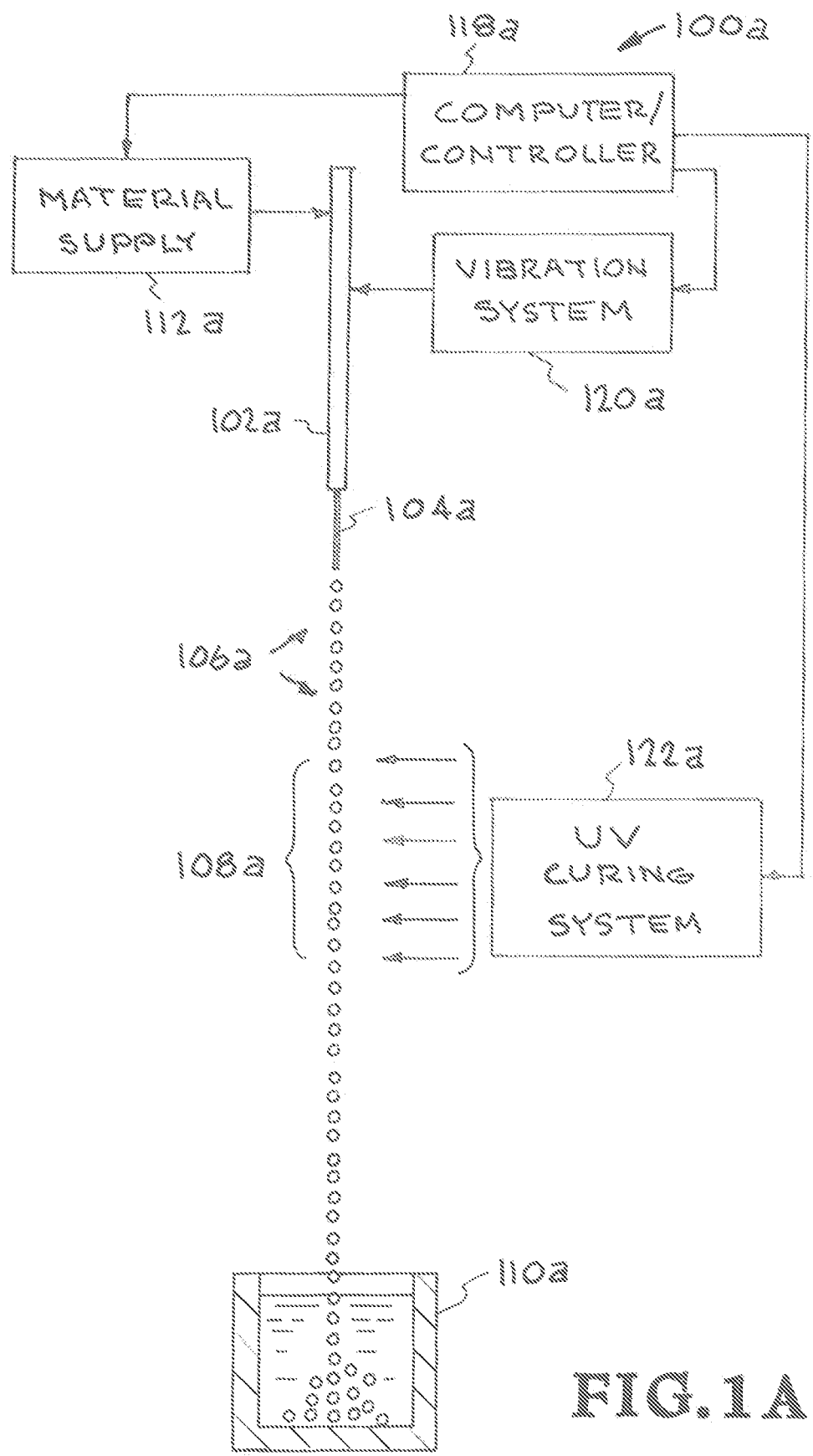
FIG. 1A is a simplified schematic depiction illustrating a first embodiment of the inventor's apparatus, systems, and methods for fabricating structured particles through rapid hardening and tailored collection.

Referring to the drawings, to the following detailed description, and to incorporated materials, detailed information about the apparatus, systems, and methods is provided including the description of specific embodiments. The detailed description serves to explain the principles of the apparatus, systems, and methods. The apparatus, systems, and methods are susceptible to modifications and alternative forms. The application is not limited to the particular forms disclosed. The application covers all modifications, equivalents, and alternatives falling within the spirit and scope of the apparatus, systems, and methods as defined by the claims.

The inventors have developed a system for fabricating structured particles through rapid hardening and tailored collection. Various embodiments of this system provide fabricating functional polymer-based particles by crosslinking UV-curable polymer drops in mid-air and collecting crosslinked particles in a solid container, a liquid suspension, or an air flow. Particles can contain different phases in the form of layered structures that contain one to multiple cores, or structures that are blended with dissolved or emulsified smaller domains. Particles can be spherical, oval-shaped or irregularly shaped with a size range of 1-10 mm. Hardening of the particles is achieved by crosslinking the polymer precursor drop, which are generated by co-axial nozzles, with UV when the drops travel through the exposure window. Particles can also be obtained through thermal setting and solvent extraction after collection. Crosslinked particles are gathered with different collection methods depending on their properties. Final products can be used for carbon dioxide capture, display material, chemical sensing, bio reaction, and other applications. The inventor's apparatus, systems, and methods were mainly developed for scale-up production of functional particles and capsules, which could eventually be used in applications such as carbon capture, display material, chemical sensing, bio reaction, enzyme scaffold, and other applications that uses functional particles/capsules.

Microencapsulation using vibrating technology and monodispersed particles can be made by applying vibration to a liquid stream coming out of a nozzle. In various embodiments, double-walled polymer microspheres of controllable shell thickness provide production of capsules for bio applications by producing monodispersed drops in air and collecting them in solution bath for shell formation. "Ceramic microparticles and capsules via microfluidic processing of a preceramic polymer" are produced by a microfluidic-based method for production of different capsule and particle microstructures by crosslinking emulsion drops in a liquid environment after drop generation.

This invention eliminates the need of having a carrier fluid during emulsion generation by making drops in air through injection. Drops' movement is affected by gravity, the angle of the nozzle, and the flow rate of the fluids. By using polymer precursor that can cure within seconds of UV exposure, encapsulation is completed by the time particles are collected, greatly reducing the fabrication time. Single unit production rate is 50×-1000× more than that shown in typical microfluidic-based production, and the production apparatus can be parallelized for even higher production.

In various embodiments the whole apparatus is installed inside an air-tight, sound-baffling and UV-blocking box. Cameras are set up outside the box through a viewing window for observation and characterization. Microfluidic device with co-axial nozzles are manufactured by using glass capillaries or stainless-steel tubes. The diameters of the capillaries and tubes ranged from 5 μm to 10 mm and can be surface functionalized. Different fluids are pushed through connection pieces into the device to form a fluid jet and drops will form near the tip. Volumetric flow rates of the fluids are in the range of 1 ml/hr to 500 ml/hr for a single unit and multiplies proportionally when many units are parallelized.

A microfluidic chip can be operated as-is or with an external vibration source such as a contact speaker or piezo electric device. Negative tone photo-responsive resins to be used should be highly sensitive to the UV lamp, and contain multifunctional cross-linking monomers. Multifunctionality enables high curing rates to obtain high chemical conversions during the residence time when drops are exposed to UV. The photoinitiator compound utilized should have an absorbance peak maximum at the lamp wavelength for effective curing. Inhibitor species are to be used minimally for maintaining uncured resin stability in the syringe, tubing and device prior to exiting the device capillary. Polymer drops are cured or partially-cured before collected and post-curing can be performed for full crosslinking. During operation, an inert gas environment can be utilized for formulations composed of oxygen inhibited monomers (such as those containing acrylate species). An oxygen-free environment minimizes the induction period, providing instantaneously fast reaction speeds once the resin droplet falls within the UV exposure window. UV lamps can be stacked or used from different sides to facilitate the cross-linking of the polymer drops. In addition, polymer used in drop generation can be obtained through thermal setting, solvent extraction or a combination of these.

After the particles get crosslinked, they can be collected in a container or in a liquid bath. Options of the liquid bath are solvents with a density in the range of 0.7-1.5 g/ml and surface tension in the range of 8-100 mN/m. Examples are: liquid nitrogen, isopropanol, toluene, and water-based mixtures. The fluids can be still, stirred or shaken in motion. In addition, the fabricated particles can also be collected with the aid of air flow. Air flow can come from the bottom of the container to slow down the speed of the incoming drops to reduce capsule breakage. In this case, the top rim of the collection container will extend to the device level and is composed of UV permeable material such as quartz. The air flow is distributed evenly from the bottom of the container to counteract the falling particles and soften the impact during collection. Furthermore, air flow can also be used to divert the direction of the falling particles by blowing sideways. In this case, particles will be collected in a container not directly underneath the fabrication device.

Alternatively, the drop generation apparatus can be operated at different angles and the collection bath can be placed at different locations. For example, the nozzle can face upwards at an angle. This increases the residence time of the capsules through the UV exposure window. This also decreases the capsule speed when they are collected for reduced impact that could cause bursting of the shell. Capsules can also be collected onto a slope near the apex of trajectory, transiting them into a moderate collection path. The slope can be surface treated with non-stick coating (i.e. Teflon) or covered with a layer of rinsing fluid which will be distributed from the end near the incoming particles. A UV lamp could also be placed near the slope for improved UV crosslinking.

Referring now to the drawings and in particular to FIG. 1A, a simplified schematic depiction illustrates a first embodiment of the inventor's apparatus, systems, and methods. This first embodiment is designated generally by the reference numeral 100a. As illustrated, the embodiment 100a includes a number of components. The components of the inventor's apparatus, systems, and methods 100a illustrated in FIG. 1A are identified and described below.

Reference Numeral 100a—Fabrication Device
Reference Numeral 102a—Device
Reference Numeral 104a—Fluid Jet
Reference Numeral 106a—Droplets
Reference Numeral 108a—Curing Zone
Reference Numeral 110a—Collection System
Reference Numeral 112a—Material Supply
Reference Numeral 118a—Computer Controller
Reference Numeral 120a—Vibration System
Reference Numeral 122a—UV Curing System The description of the fabrication device 100a components illustrated in FIG. 1A having been completed, the operation and additional description of the inventor's first embodiment apparatus, systems, and methods will now be considered in greater detail. The jet forming device 102a includes a nozzle that produces the jet stream 104a. FIG. 1A shows the encapsulation apparatus with jet stream 104a running along the direction of gravity. The material supply 112a feeds the material into the jet forming device 102a. The vibration system 120a imparts vibration to the jet stream 104a that produces the droplets 106a. The droplets 106a pass through the curing zone 108a where they are cured by the UV curing system 122a. The cured droplets 106a are directed into the collection system 110a. The operation of the fabrication device 100a is implemented and controlled by the computer controller 118a.

Figure 1B:
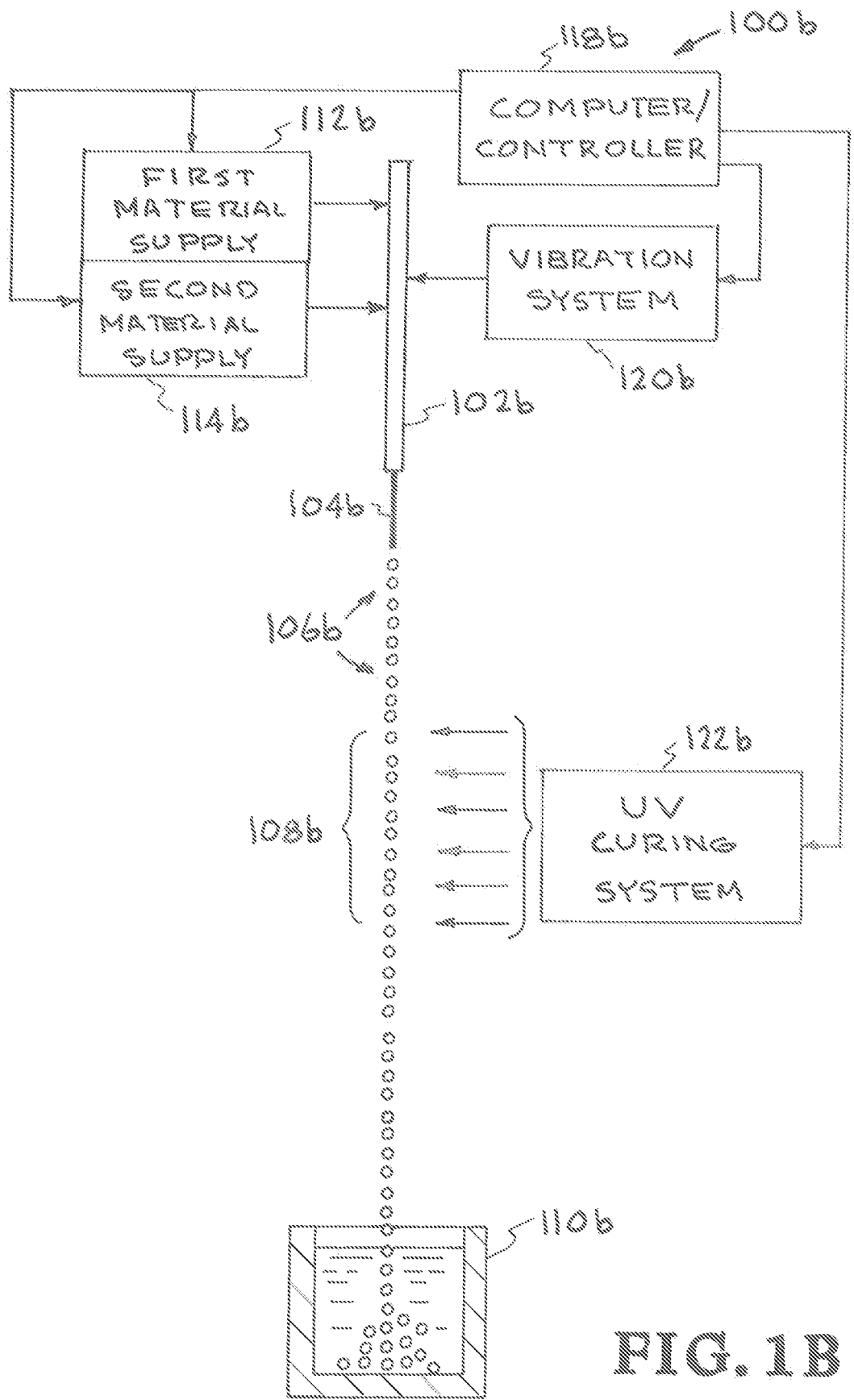
FIG. 1B is a simplified schematic depiction illustrating a second embodiment of the inventor's apparatus, systems, and methods for fabricating structured particles through rapid hardening and tailored collection.

Referring to FIG. 1B, a simplified schematic depiction illustrates a second embodiment of the inventor's apparatus, systems, and methods. This second embodiment is designated generally by the reference numeral 100b. As illustrated, the embodiment 100b includes a number of components. The components of the inventor's apparatus, systems, and methods 100b illustrated in FIG. 1B are identified and described below.

Reference Numeral 100b—Co-Axial Fabrication Device
Reference Numeral 102b—Device
Reference Numeral 104b—Fluid Jet
Reference Numeral 106b—Droplets
Reference Numeral 108b—Curing Zone
Reference Numeral 110b—Collection System
Reference Numeral 112b—First Material Supply
Reference Numeral 114b—Second Material Supply
Reference Numeral 118b—Computer Controller
Reference Numeral 120b—Vibration System
Reference Numeral 122b—UV Curing System The description of the co-axial fabrication device components illustrated in FIG. 1B having been completed, the operation and additional description of the inventor's second embodiment 100b apparatus, systems, and methods will now be considered in greater detail. The jet forming device 102b includes a nozzle that produces the jet stream 104b. FIG. 1B shows the encapsulation apparatus with jet stream 104b running along the direction of gravity. The first material supply 112b and second material supply 114b feed the two materials into the jet forming device 102b. The vibration system 120b imparts vibration to the jet stream 104b that produces the droplets 106b. The droplets 106b that exit the jet forming device 102b are capsules that have an internal core of the first material 112b and an outer shell of the second material 114b completely surrounding the internal core of the first material 112b. The droplets 106b pass through the curing zone 108b where they are cured by the UV curing system 122b. The cured droplets 106b are directed into the collection system 110b. The operation of the fabrication device 100b is implemented and controlled by the computer controller 118b.

The present invention is further described and illustrated by a number of examples of apparatus, systems, and methods constructed in accordance with the present invention. Various changes and modifications of these examples will be apparent to those skilled in the art from the description of the examples and by practice of the invention. The scope of the invention is not intended to be limited to the particular examples disclosed and the invention covers all modifications, equivalents, and alternatives falling within the spirit and scope of the invention as defined by the claims.

Example 1—Co-Axial Fabrication Method

The whole co-axial fabrication system illustrated in FIG. 1B provides a method of fabricating functional polymer-based particles by crosslinking UV-curable polymer drops in mid-air and collecting crosslinked particles in a solid container, a liquid suspension, or an air flow. Particles contain different phases in the form or layered structures that contain one to multiple cores, or structures that are blended with dissolved or emulsified smaller domains. Particles can be spherical, oval-shaped or irregularly shaped with a size range of 1-10 mm. Hardening of the particles is achieved by crosslinking the polymer precursor drop, which are generated by co-axial nozzles, with UV when the drops travel through the exposure window. Particles can also be obtained through thermal setting and solvent extraction after collection. Crosslinked particles will be gathered with different collection methods depending on their properties. Final products can be used for carbon dioxide capture, display material, chemical sensing, bio reaction, etc.

Example 2—Co-Axial Fabrication Device

The whole co-axial fabrication device illustrated in FIG. 1B is installed inside an air-tight, sound-baffling and UV-blocking box. Cameras are set up outside the box through a viewing window for observation and characterization. Microfluidic device with co-axial nozzles are manufactured by using glass capillaries or stainless-steel tubes. The diameters of the capillaries and tubes ranged from 5 μm to 10 mm and can be surface functionalized. Different fluids are pushed through connection pieces into the device to form a fluid jet and drops will form near the tip. Volumetric flow rates of the fluids are in the range of 1 ml/hr to 500 ml/hr for a single unit and multiplies proportionally when many units are parallelized.

A microfluidic chip varication system can be operated as-is or with an external vibration source such as a contact speaker or piezo electric device. Negative tone photo-responsive resins used are highly sensitive to the UV lamp, and contain multifunctional cross-linking monomers. Multifunctionality enables high curing rates to obtain high chemical conversions during the residence time when drops are exposed to UV. The photoinitiator compound utilized must have an absorbance peak maximum at the lamp wavelength for effective curing. Inhibitor species are to be used minimally for maintaining uncured resin stability in the syringe, tubing and device prior to exiting the device capillary. Polymer drops are cured or partially-cured before collected and post-curing can be performed for full cross-linking. During operation, an inert gas environment can be utilized for formulations composed of oxygen inhibited monomers (such as those containing acrylate species). An oxygen-free environment minimizes the induction period, providing instantaneously fast reaction speeds once the resin droplet falls within the UV exposure window. UV lamps can be stacked or used from different sides to facilitate the crosslinking of the polymer drops. In addition, polymer used in drop generation can be obtained through thermal setting, solvent extraction or a combination of these.

Figure 1C:
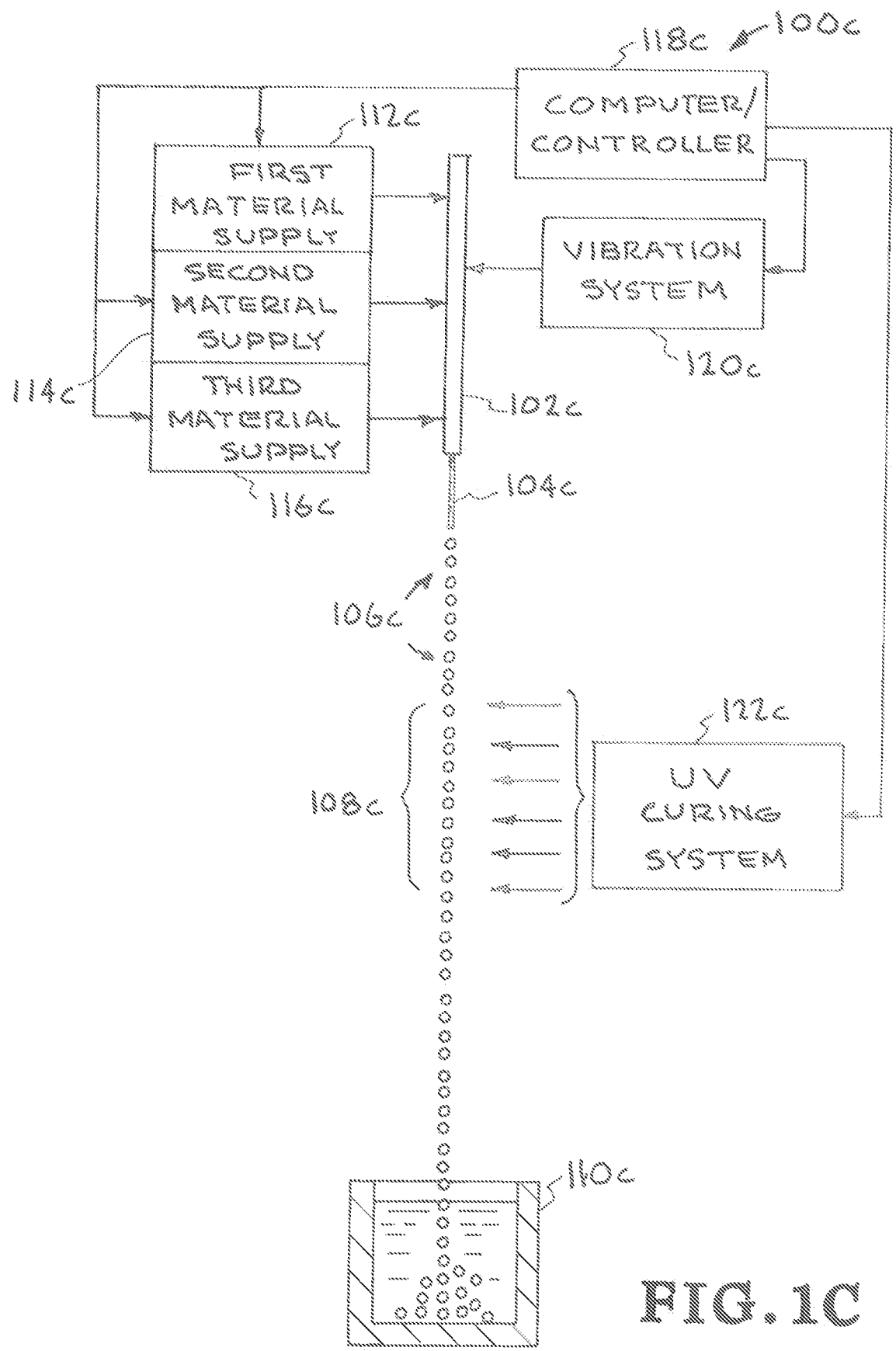
FIG. 1C is a simplified schematic depiction illustrating a third embodiment of the inventor's apparatus, systems, and methods for fabricating structured particles through rapid hardening and tailored collection.

Referring to FIG. 1C, a simplified schematic depiction illustrates a third embodiment of the inventor's apparatus, systems, and methods. This embodiment is designated generally by the reference numeral 100c. As illustrated, the embodiment 100c includes a number of components. The components of the inventor's apparatus, systems, and methods 100c illustrated in FIG. 1C are identified and described below.

Reference Numeral 100c—Co-Axial Fabrication Device
Reference Numeral 102c—Device
Reference Numeral 104c—Fluid Jet
Reference Numeral 106c—Droplets
Reference Numeral 108c—Curing Zone
Reference Numeral 110c—Collection System
Reference Numeral 112c—First Material Supply Reference Numeral 114c—Second Material Supply
Reference Numeral 116c—Third Material Supply
Reference Numeral 118c—Computer Controller
Reference Numeral 120c—Vibration System
Reference Numeral 122c—UV Curing The description of the co-axial fabrication device components illustrated in FIG. 1C having been completed, the operation and additional description of the inventor's third embodiment 100c apparatus, systems, and methods will now be considered in greater detail. The jet forming device 102c includes a nozzle that produces the jet stream 104c. FIG. 1C shows the encapsulation apparatus with jet stream 104c running along the direction of gravity. The first material supply 112c, the second material supply 114c, and the third material supply 116c feed the three materials into the jet forming device 102c. The vibration system 120c imparts vibration to the jet stream 104c that produces the droplets 106c. The droplets 106c that exit the jet forming device 102c are capsules that have an internal core of one material, a shell of a second material, and the third material associated with the first and second materials.

Various combinations of the first, second, and third materials in the droplets 106c can be produced by the Co-Axial Fabrication Device 100c. For example, in one version the capsules have an internal core of the first material 112c, a shell made of the second material 114c that completely surrounds the internal core of the first material 112c, and a second shell made of the third material 116c that completely surrounds the internal core of the first material 112c and the shell made of the second material 114c.

The droplets 106c pass through the curing zone 108c where they are cured by the UV curing system 122c. The cured droplets 106c are directed into the collection system 110c. The operation of the fabrication device 100b is implemented and controlled by the computer controller 118c.

Figure 1D:
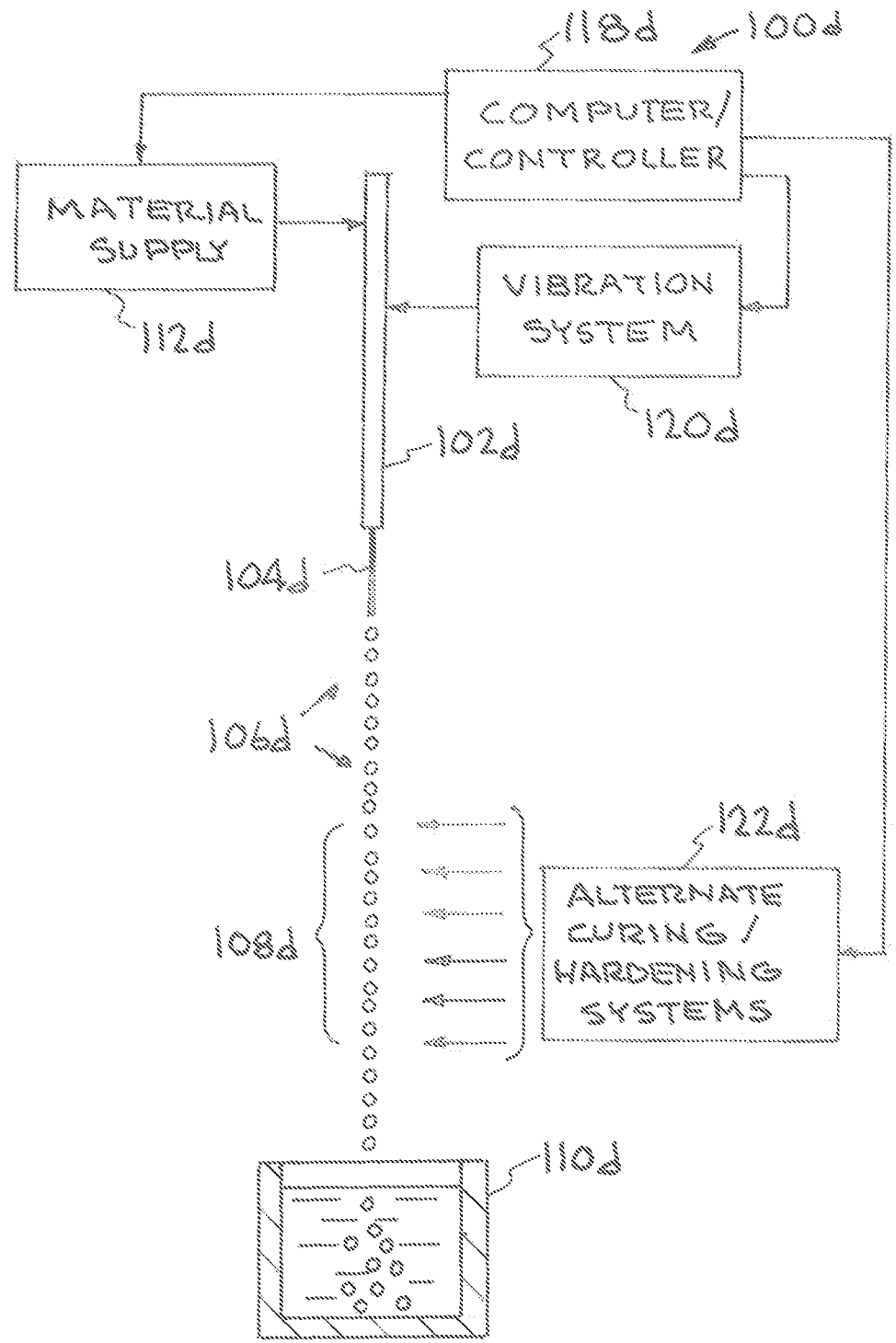
FIG. 1D is a simplified schematic depiction illustrating a fourth embodiment of the inventor's apparatus, systems, and methods for fabricating structured particles through rapid hardening and tailored collection.

Referring now to FIG. 1D, a simplified schematic depiction illustrates a fourth embodiment of the inventor's apparatus, systems, and methods. This fourth embodiment is designated generally by the reference numeral 100d. As illustrated, the embodiment 100d includes a number of components. The components of the inventor's apparatus, systems, and methods 100da illustrated in FIG. 1D are identified and described below.
Reference Numeral 100d—Fabrication Device
Reference Numeral 102d—Device
Reference Numeral 104d—Fluid Jet
Reference Numeral 106d—Droplets
Reference Numeral 108d—Curing/Hardening Zone
Reference Numeral 110d—Collection System
Reference Numeral 112d—Material Supply
Reference Numeral 118d—Computer Controller
Reference Numeral 120d—Vibration System
Reference Numeral 122a—Alternate Curing/Hardening Systems The description of the fabrication device 100d components illustrated in FIG. 1D having been completed, the operation and additional description of the inventor's fourth embodiment apparatus, systems, and methods will now be considered in greater detail. The jet forming device 102d includes a nozzle that produces the jet stream 104d. FIG. 1D shows the encapsulation apparatus with jet stream 104d running along the direction of gravity. The material supply 112d feeds the material into the jet forming device 102d. The vibration system 120d imparts vibration to the jet stream 104d that produces the droplets 106d. The droplets 106d pass through the curing/hardening zone 108d where they are cured and/or hardened by the alternate curing/hardening systems 122d. The cured and/or hardened droplets 106d are directed into the collection system 110d. The operation of the fabrication device 100d is implemented and controlled by the computer controller 118d.

Figure 2A:
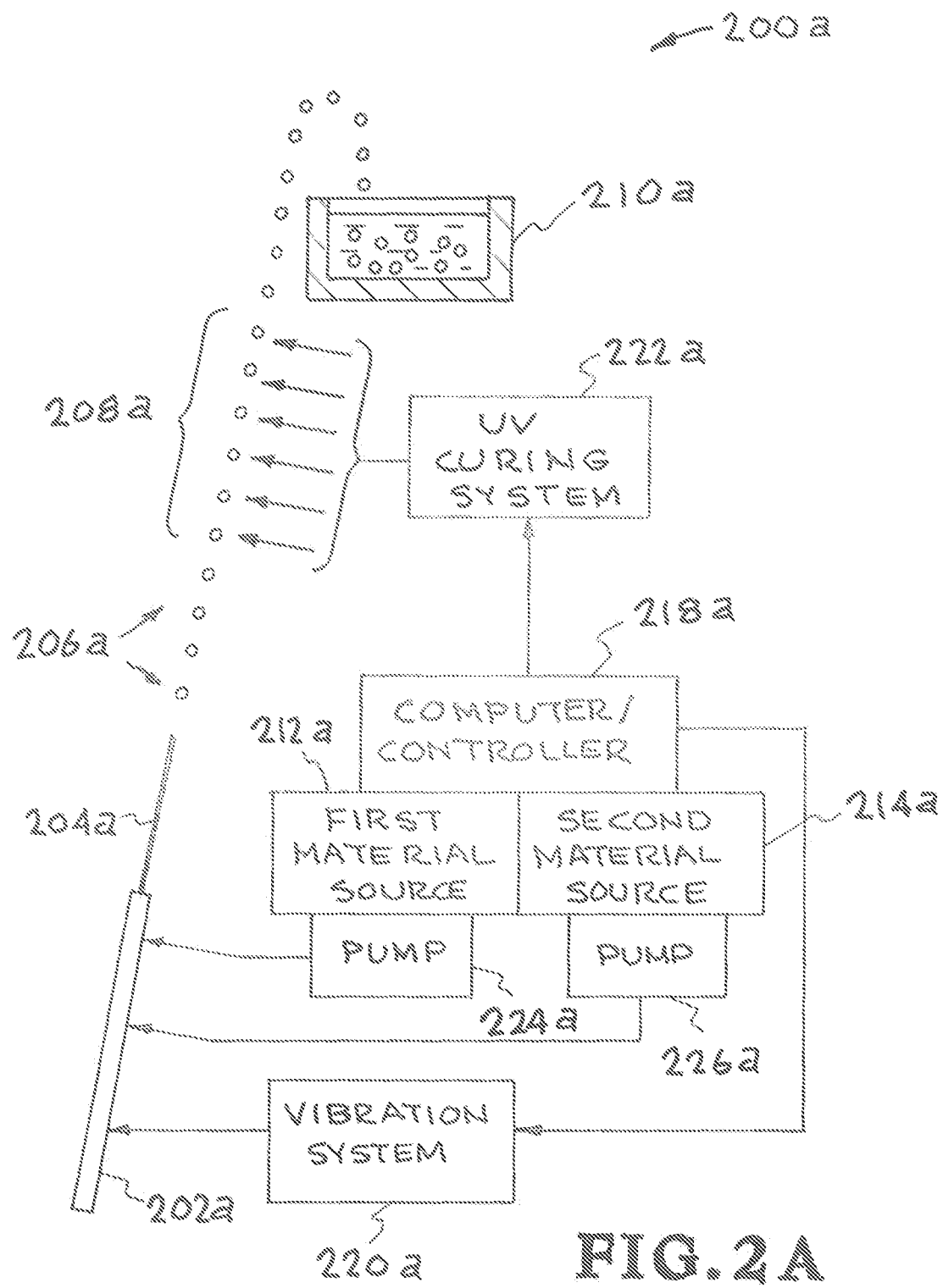
FIG. 2A is a simplified schematic depiction illustrating an embodiment of the inventor's apparatus, systems, and methods wherein the fluid jet and droplet stream are running against and at an angle to the direction of gravity.

Referring to FIG. 2A, a simplified schematic depiction illustrates an embodiment of the inventor's apparatus, systems, and methods wherein the fluid jet and droplet stream are running against and at an angle to the direction of gravity. This embodiment is designated generally by the reference numeral 200a. As illustrated, the embodiment 200a includes a number of components. The components of the inventor's apparatus, systems, and methods 200a illustrated in FIG. 2A are identified and described below.
Reference Numeral 200a—Co-Axial Fabrication Device
Reference Numeral 202a—Device
Reference Numeral 204a—Fluid Jet
Reference Numeral 206a—Droplets
Reference Numeral 208a—Curing Zone
Reference Numeral 210a—Collection System
Reference Numeral 212a—First Material Supply
Reference Numeral 214a—Second Material Supply
Reference Numeral 218a—Computer Controller
Reference Numeral 220a—Vibration System
Reference Numeral 222a—UV Curing System
Reference Numeral 224a—First Pump
Reference Numeral 226a—Second Pump The description of the co-axial fabrication device components illustrated in FIG. 2A having been completed, the operation and additional description of the inventor's embodiment 200a co-axial fabrication device apparatus, systems, and methods will now be considered in greater detail. The jet forming device 202a includes a nozzle that produces the jet stream 204a. FIG. 2A shows the encapsulation apparatus with jet stream 204a and the droplets 206a running against and at an angle to the direction of gravity. The first pump 224a and the second pump 226a move the jet stream 204a and the droplets 206a against gravity.

The droplets 206a movement is affected by gravity, the angle of the nozzle, and the flow rate of the fluids. By using polymer precursor that can cure within seconds of UV exposure, encapsulation is completed by the time particles are collected, greatly reducing the fabrication time. Single unit production rate is 50×-1000× more than that shown in typical microfluidic-based production, and the production apparatus can be parallelized for even higher production.

The first material supply 212a and second material supply 214a feed the two materials into the jet forming device 202a. The vibration system 220a imparts vibration to the jet stream 204a that produces the droplets 206a. The droplets 206a that exit the jet forming device 202s are capsules that have an internal core of the first material 212a and an outer shell of the second material 214a completely surrounding the internal core of the first material 212a. The droplets 206a pass through the curing zone 208a where they are cured by the UV curing system 222a. The cured droplets 206a are directed into the collection system 210a. The operation of the fabrication device 200a is implemented and controlled by the computer controller 218a.

Figure 2B:
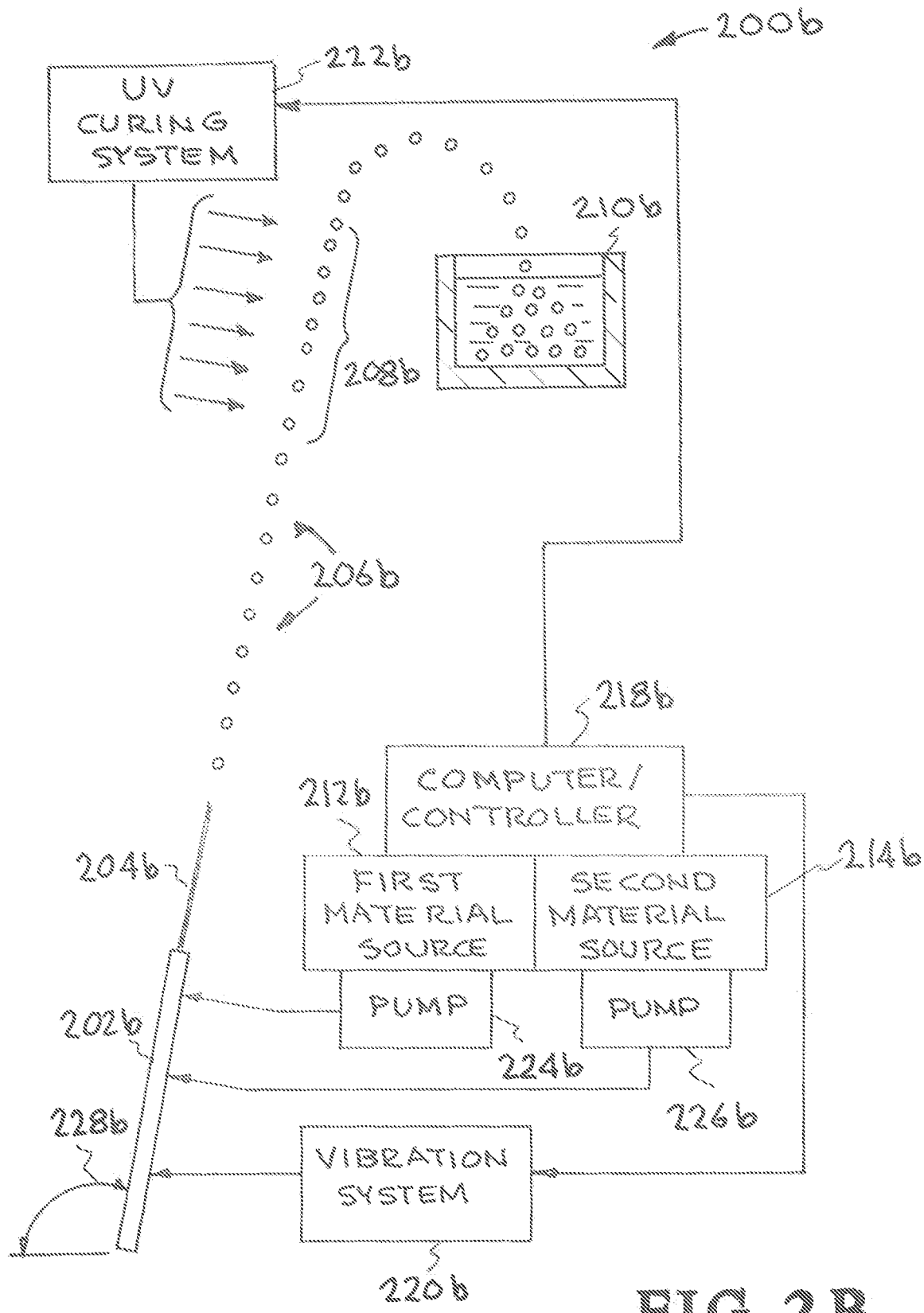
FIG. 2B is a simplified schematic depiction illustrating another embodiment of the inventor's apparatus, systems, and methods wherein the fluid jet and droplet stream are running against and at an angle to the direction of gravity.

Referring to FIG. 2B, a simplified schematic depiction illustrates an embodiment of the inventor's apparatus, systems, and methods wherein the fluid jet and droplet stream are running against and at an angle to the direction of gravity and there is a moveable UV curing system. This embodiment is designated generally by the reference numeral 200b. As illustrated, the embodiment 200b includes a number of components. The components of the inventor's apparatus, systems, and methods 200b illustrated in FIG. 2B are identified and described below.

Reference Numeral 200b—Co-Axial Fabrication Device
    Reference Numeral 202b—Device
    Reference Numeral 204b—Fluid Jet
    Reference Numeral 206b—Droplets
    Reference Numeral 208b—Curing Zone
    Reference Numeral 210b—Collection System
    Reference Numeral 212b—First Material Supply
    Reference Numeral 214b—Second Material Supply
    Reference Numeral 218b—Computer Controller
    Reference Numeral 220b—Vibration System
    Reference Numeral 222b—UV Curing System
    Reference Numeral 224b—First Pump
    Reference Numeral 226b—Second Pump
    Reference Numeral 228b—Angle The description of the co-axial fabrication device components illustrated in FIG. 2B having been completed, the operation and additional description of the inventor's embodiment 200b co-axial fabrication device apparatus, systems, and methods will now be considered in greater detail. The jet forming device 202b includes a nozzle that produces the jet stream 204b. FIG. 2B shows the encapsulation apparatus with jet stream 204b and the droplets 206b running against and at an angle 228b to the direction of gravity. The first pump 224b and the second pump 226b move the jet stream 204b and the droplets 206b against gravity.

The droplets 206b movement is affected by gravity, the angle of the nozzle, and the flow rate of the fluids. By using polymer precursor that can cure within seconds of UV exposure, encapsulation is completed by the time particles are collected, greatly reducing the fabrication time. Single unit production rate is 50×-1000× more than that shown in typical microfluidic-based production, and the production apparatus can be parallelized for even higher production.

The first material supply 212b and second material supply 214b feed the two materials into the jet forming device 202b. The vibration system 220b imparts vibration to the jet stream 204b that produces the droplets 206b. The droplets 206b that exit the jet forming device 202b are capsules that have an internal core of the first material 212b and an outer shell of the second material 214b completely surrounding the internal core of the first material 212b.

The droplets 206b pass through the curing zone 208b where they are cured by the UV curing system 222b. The droplet generation apparatus can be operated at different angles and the collection bath can be placed at different locations. Also, there is a moveable UV curing system. The nozzle can face upwards at an angle. This increases the residence time of the capsules through the UV exposure window. The cured droplets 206b are directed into the collection system 210b. The operation of the fabrication device 200b is implemented and controlled by the computer controller 218b.

Figure 2C:
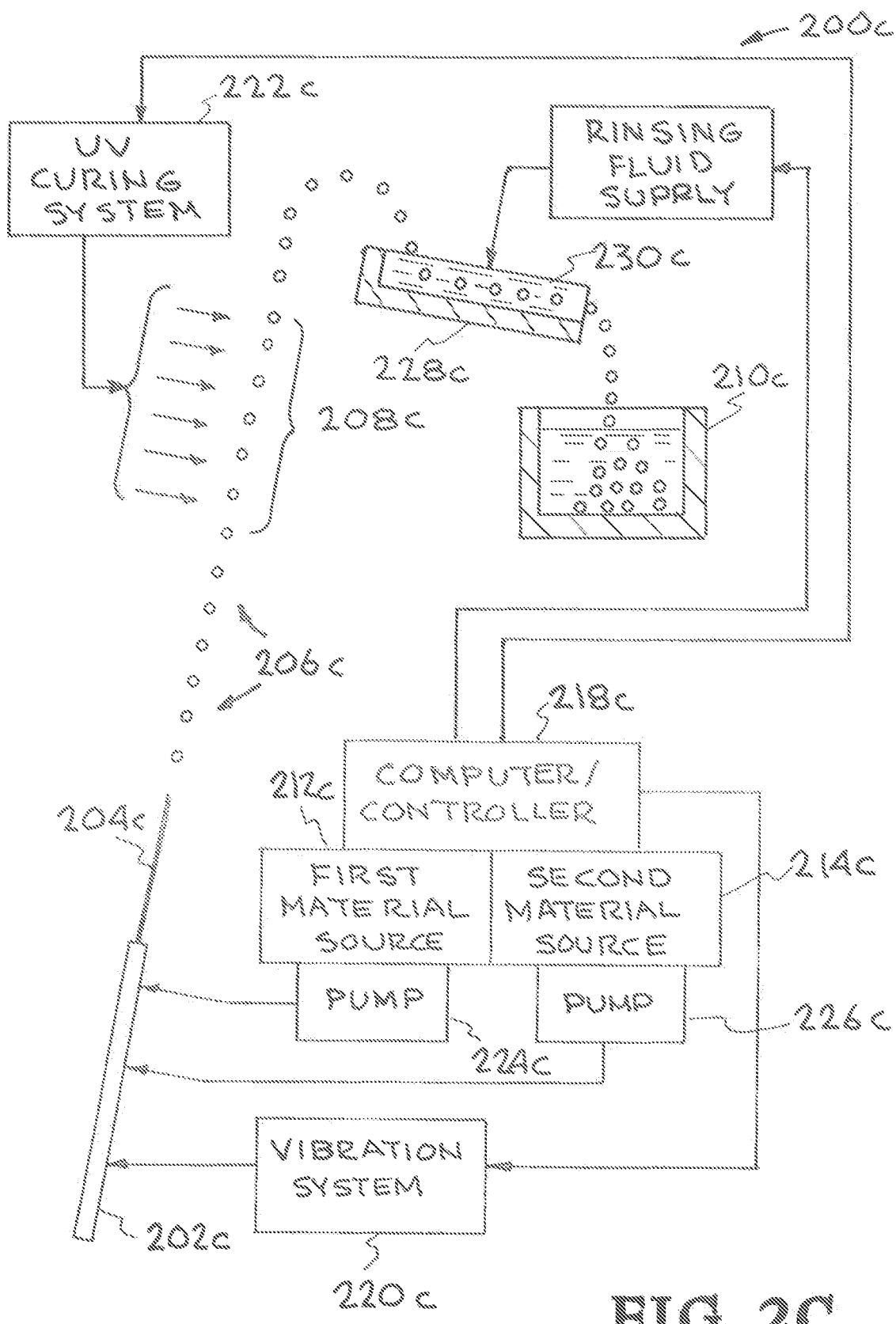
FIG. 2C is a simplified schematic depiction illustrating yet another embodiment of the inventor's apparatus, systems, and methods wherein the fluid jet and droplet stream are running against and at an angle to the direction of gravity.

Referring to FIG. 2C, a simplified schematic depiction illustrates an embodiment of the inventor's apparatus, systems, and methods wherein the fluid jet and droplet stream are running against and at an angle to the direction of gravity and there is a droplet rising system. This embodiment is designated generally by the reference numeral 200c. As illustrated, the embodiment 200c includes a number of components. The components of the inventor's apparatus, systems, and methods 200c illustrated in FIG. 2C are identified and described below.

Reference Numeral 200c—Co-Axial Fabrication Device
    Reference Numeral 202c—Device
    Reference Numeral 204c—Fluid Jet
    Reference Numeral 206c—Droplets
    Reference Numeral 208c—Curing Zone
    Reference Numeral 210c—Collection System
    Reference Numeral 212c—First Material Supply
    Reference Numeral 214c—Second Material Supply
    Reference Numeral 218c—Computer Controller
    Reference Numeral 220c—Vibration System
    Reference Numeral 222c—UV Curing System
    Reference Numeral 224c—First Pump
    Reference Numeral 226c—Second Pump
    Reference Numeral 228c—Rinsing Fluid Tray
    Reference Numeral 230c—Rinsing Fluid The description of the co-axial fabrication device components illustrated in FIG. 2C having been completed, the operation and additional description of the inventor's embodiment 200c co-axial fabrication device apparatus, systems, and methods will now be considered in greater detail. The jet forming device 202c includes a nozzle that produces the jet stream 204c. FIG. 2C shows the encapsulation apparatus with jet stream 204c and the droplets 206c running against and at an angle to the direction of gravity. The first pump 224c and the second pump 226c move the jet stream 204c and the droplets 206c against gravity.

The droplets 206c movement is affected by gravity, the angle of the nozzle, and the flow rate of the fluids. By using polymer precursor that can cure within seconds of UV exposure, encapsulation is completed by the time particles are collected, greatly reducing the fabrication time. Single unit production rate is 50×-1000× more than that shown in typical microfluidic-based production, and the production apparatus can be parallelized for even higher production.

The first material supply 212c and second material supply 214c feed the two materials into the jet forming device 202c. The vibration system 220c imparts vibration to the jet stream 204c that produces the droplets 206c. The droplets 206c that exit the jet forming device 202c are capsules that have an internal core of the first material 212c and an outer shell of the second material 214c completely surrounding the internal core of the first material 212c.

The droplets 206c pass through the curing zone 208c where they are cured by the UV curing system 222c. The droplet generation apparatus can be operated at different angles and the collection bath can be placed at different locations. Also, there is a moveable UV curing system. The nozzle can face upwards at an angle. This increases the residence time of the capsules through the UV exposure window. The cured droplets 206c are directed into the rinsing fluid tray 228c and rinsed by rinsing fluid 230c before the droplets 206c are directed into the collection system 210c. The operation of the fabrication device 200c is implemented and controlled by the computer controller 218c.

Referring to FIGS. 3A-3E, a number of examples of droplets that are produced by the inventor's system for fabricating structured particles through rapid hardening and tailored collection. The examples in FIGS. 3A-3E can be produced by various combinations of the first, second, and/or third materials produced by the co-axial fabrication devices. The droplets depicted in FIGS. 3A-3E are identified by the reference numerals 300a, 300b, 300c, 300d, and 300e respectively.

Referring to FIG. 3A, an example of a droplet 300a produced by the inventor's system illustrated in FIG. 1A is shown. The droplet 300a has an internal core 302a. The droplet 300a can have a hardened surface 304a.

Referring to FIG. 3B, an example of a droplet 300b produced by the inventor's system illustrated in FIG. 1B is shown. The droplet 300b has an internal core 302b of the first material and a shell 304b made of the second material that completely surrounds the internal core 302b of the first material.

Referring to FIG. 3C, an example of a droplet 300c produced by the inventor's system illustrated in FIG. 1C is shown. The droplet 300c has an internal core 302c of the first material, a shell 304c made of the second material that completely surrounds the internal core 302c of the first material, and a second shell 304c made of the third material that completely surrounds the internal core 302c of the first material and the shell 304c made of the second material.

Referring to FIG. 3D, an example of a droplet 300d produced by the inventor's system for fabricating structured particles through rapid hardening and tailored collection is shown. The droplet 300d has an internal core 302d, a shell 304d, and particles 306d within the internal core 302d.

Referring to FIG. 3E, an example of a droplet 300e produced by the inventor's system for fabricating structured particles through rapid hardening and tailored collection is shown. The droplet 300e has an internal core 302e, a shell 304e, and a matrix 306e within the internal core 302e.

Figure 4:
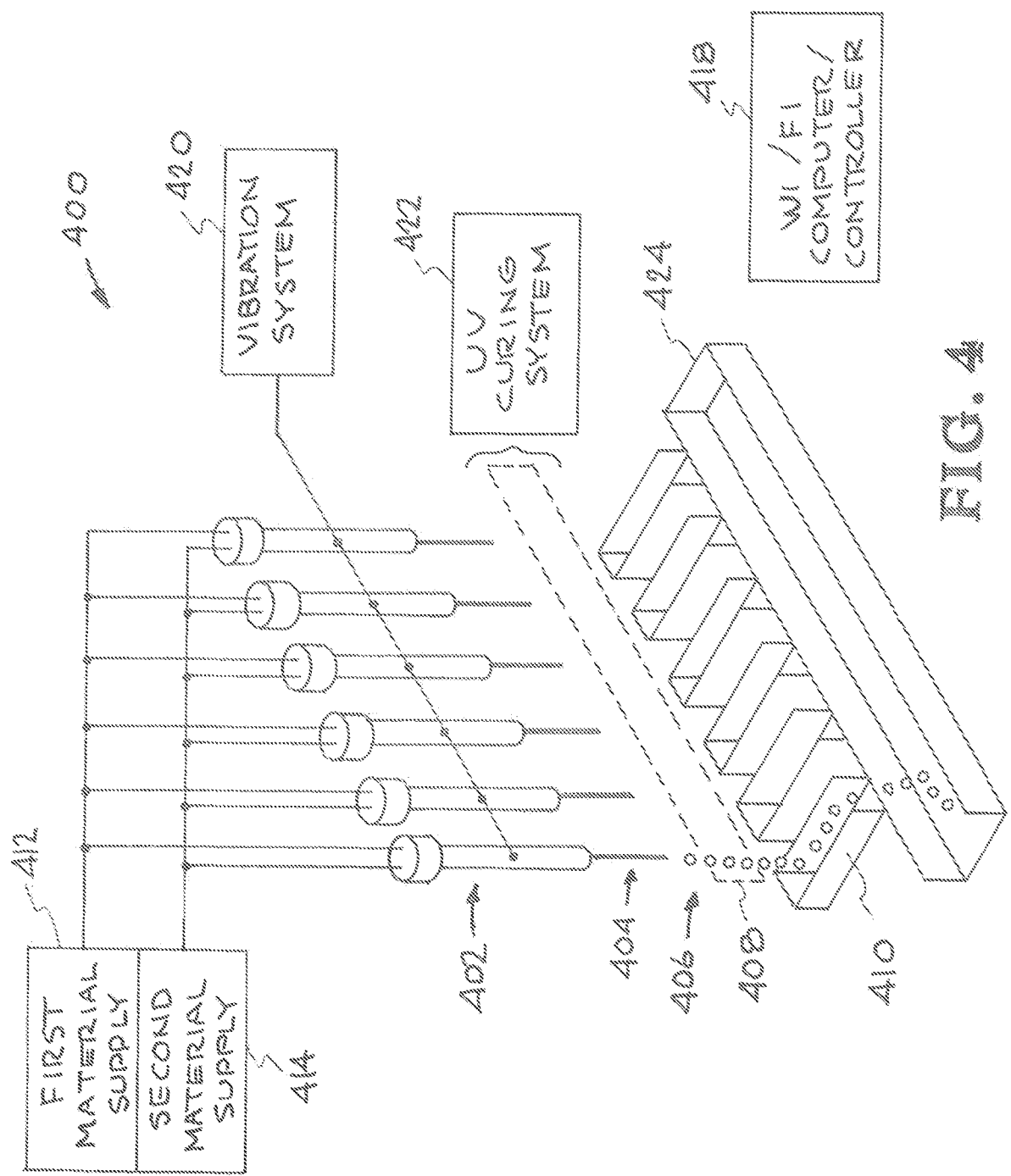
FIG. 4 is a simplified schematic depiction illustrating an embodiment of the inventor's apparatus, systems, and methods wherein multiple co-axial fabrication devices are ganged to provide a greater output of droplets.

Referring to FIG. 4, a simplified schematic depiction illustrates an embodiment of the inventor's apparatus, systems, and methods wherein multiple co-axial fabrication devices are ganged to provide a greater output of droplets. This embodiment is designated generally by the reference numeral 400. As illustrated, the embodiment 400 includes a number of components. The components of the inventor's ganged multiple co-axial fabrication devices 400 illustrated in FIG. 4 are identified and described below.

Reference Numeral 400—Multiple Co-Axial Fabrication Devices
Reference Numeral 402—Multiple Individual Units
Reference Numeral 404—Multiple Fluid Jets
Reference Numeral 406—Multiple Sets of Droplets
Reference Numeral 408—Multiple Curing Zones
Reference Numeral 410—Multiple Collection Systems
Reference Numeral 412—First Material Supply
Reference Numeral 414—Second Material Supply
Reference Numeral 418—Wi/Fi Computer Controller
Reference Numeral 420—Vibration System
Reference Numeral 422—UV Curing System
Reference Numeral 424—Master Collection System The description of the components of the inventor's ganged multiple co-axial fabrication devices 400 illustrated in FIG. 4 having been completed, the operation and additional description of the embodiment 400 will now be considered in greater detail. In many instances it is desirable to have a large output of droplets. This is accomplished by ganging multiple individual co-axial fabrication devices.

The ganged multiple co-axial fabrication devices 400 utilizes multiple individual units 402. The multiple individual units 402 can be arranged in all conceivable formats. For example, the multiple individual units 402 can be arranged in a linear arrangement, in a circular arrangement, in a rectangular arrangement, in a multilevel arrangement, and in all other conceivable arrangements.

The multiple individual units 402 include nozzles that produce jet streams 404. FIG. 4 shows the multiple individual units 402 with jet streams 404 running along the direction of gravity. A first material supply 412 and a second material supply 414 feed two separate materials into the jet forming devices 402. The vibration system 420 imparts vibration to the jet streams 404 that produce the droplets 406. The droplets 406 that exit the jet forming devices 402 are capsules that have an internal core of the first material 412 and an outer shell of the second material 414 completely surrounding the internal core of the first material 412. The droplets 406 pass through the curing zone 408 where they are cured by the UV curing system 422. The cured droplets 406 are directed into the multiple collection systems 410. The cured droplets 406 are directed from the multiple collection systems 410 into the master collection system 424. The operation of the ganged multiple co-axial fabrication devices 400 is implemented and controlled by the computer controller 418.

Figure 5:
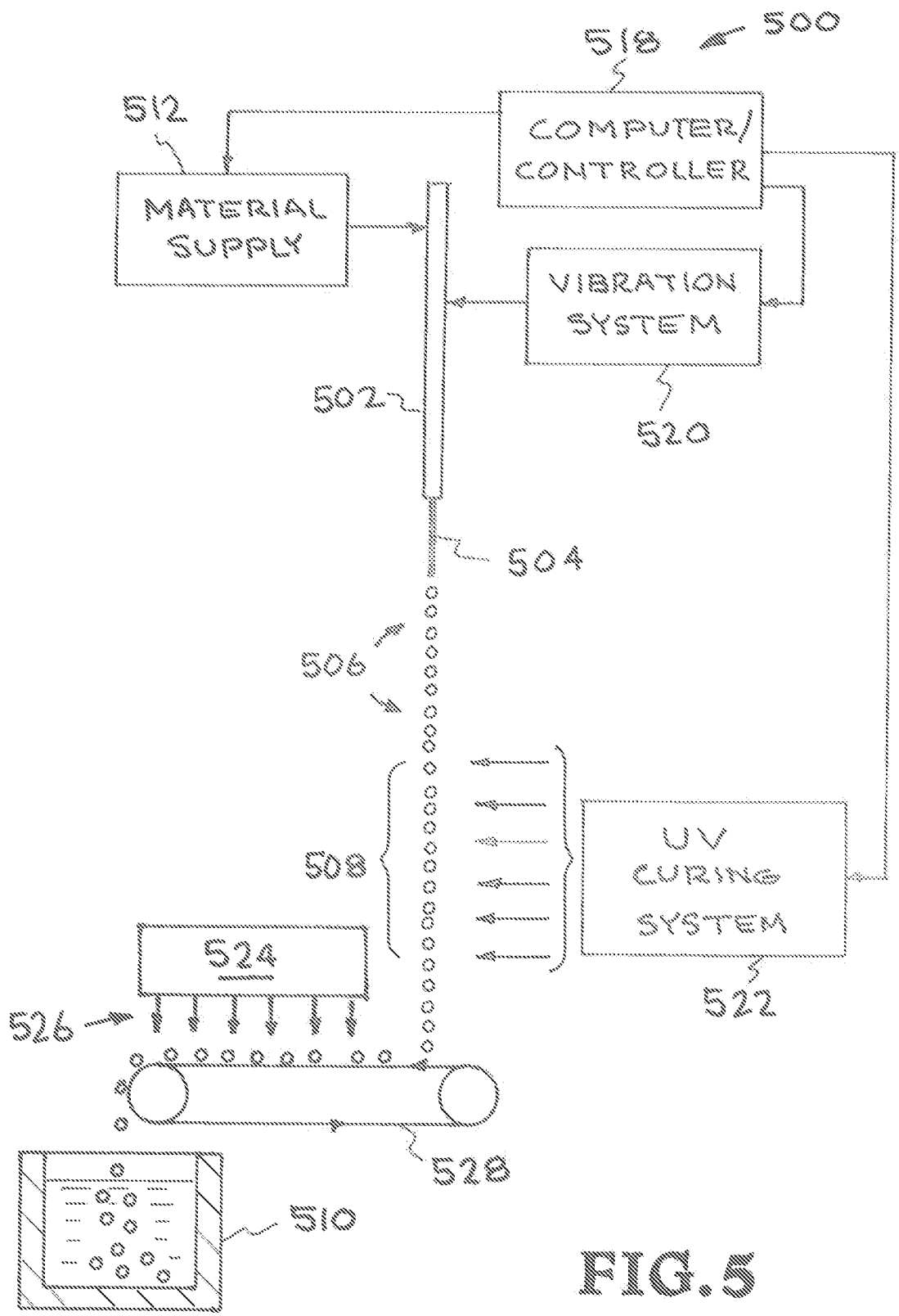
FIG. 5 illustrates an embodiment of the inventor's apparatus, systems, and methods that includes a second UV curing system.

Referring now to FIG. 5, a simplified schematic depiction illustrates an embodiment of the inventor's apparatus, systems, and methods that includes a second UV curing system. This embodiment is designated generally by the reference numeral 500. As illustrated, the embodiment 500 includes a number of components. The components of the inventor's apparatus, systems, and methods 500 illustrated in FIG. 5 are identified and described below.

Reference Numeral 500—Fabrication Device
Reference Numeral 502—Device
Reference Numeral 504—Fluid Jet
Reference Numeral 506—Droplets
Reference Numeral 508—Curing Zone
Reference Numeral 510—Collection System
Reference Numeral 512—Material Supply
Reference Numeral 518—Computer Controller
Reference Numeral 520—Vibration System
Reference Numeral 522—UV Curing System
Reference Numeral 524—Second UV Curing System
Reference Numeral 526—Second Curing Zone
Reference Numeral 528—Conveyer The description of the fabrication device 500 components illustrated in FIG. 5 having been completed, the operation and additional description of the inventor's embodiment apparatus, systems, and methods with a second UV curing system will now be considered in greater detail. The jet forming device 502 includes a nozzle that produces the jet stream 504. FIG. 5 shows the encapsulation apparatus with jet stream 504 running along the direction of gravity. The material supply 512 feeds the material into the jet forming device 502. The vibration system 520 imparts vibration to the jet stream 504 that produces the droplets 506. The droplets 506 pass through the curing zone 508 where they are cured by the UV curing system 522. After the droplets 506 pass through the curing zone 508 they are deposited on a conveyer 528 where they pass through a second curing zone 526 where they are cured by the UV curing system 524. In another embodiment the conveyer 528 is replaced by a dryer. The cured droplets 506 are directed into the collection system 510. The operation of the fabrication device 500 is implemented and controlled by the computer controller 518.

Figure 6:
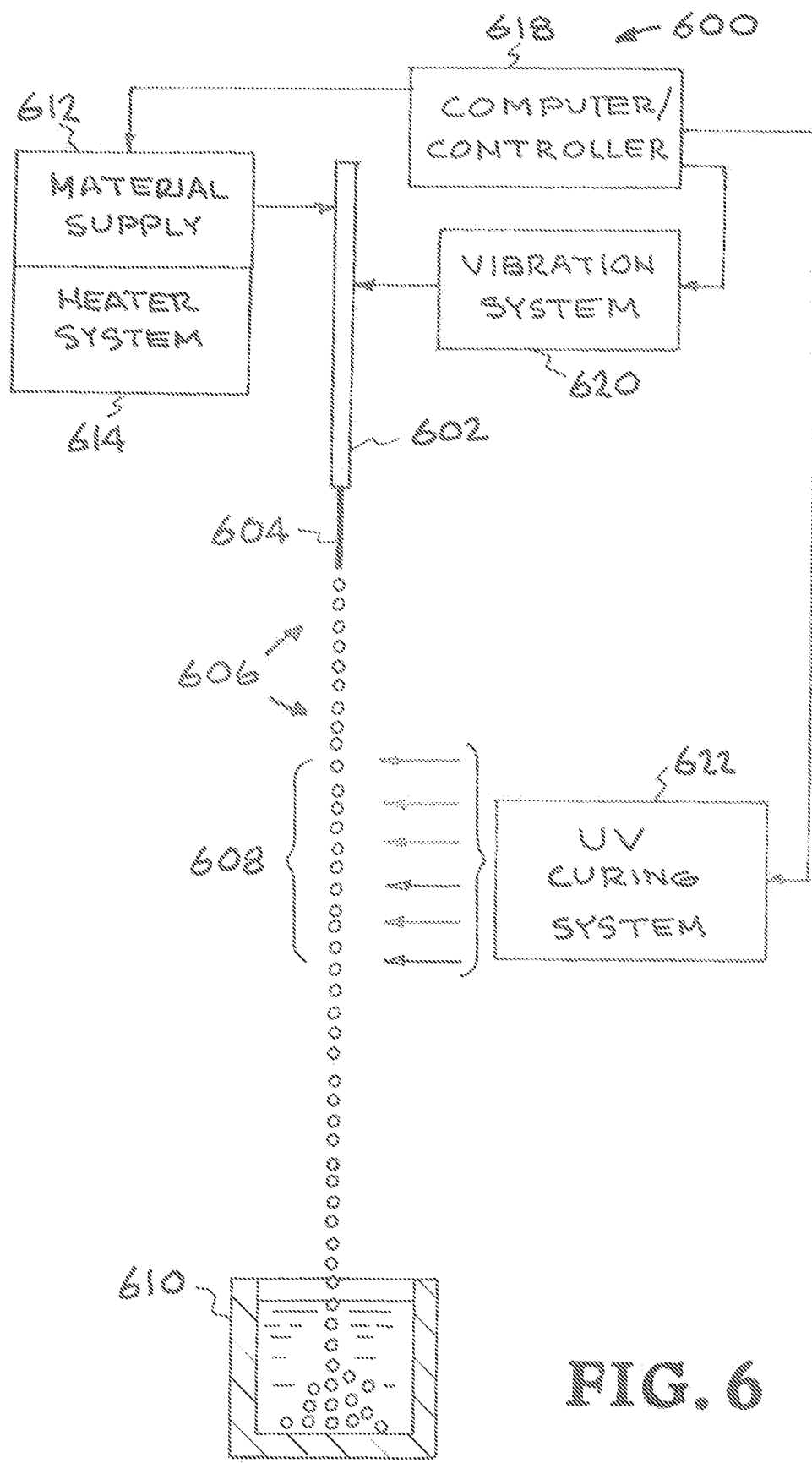
FIG. 6 illustrates an embodiment of the inventor's apparatus, systems, and methods that includes a heater for heating the material supply.

Referring now to FIG. 6, a simplified schematic depiction illustrates an embodiment of the inventor's apparatus, systems, and methods that includes a heater for heating the material supply. This embodiment is designated generally by the reference numeral 600. As illustrated, the embodiment 600 includes a number of components. The components of the inventor's apparatus, systems, and methods 600 illustrated in FIG. 6 are identified and described below.

Reference Numeral 600—Fabrication Device
Reference Numeral 602—Device
Reference Numeral 604—Fluid Jet
Reference Numeral 606—Droplets
Reference Numeral 608—Curing Zone
Reference Numeral 610—Collection System Reference Numeral 612—Material Supply
Reference Numeral 614—Heater
Reference Numeral 618—Computer Controller
Reference Numeral 620—Vibration System
Reference Numeral 622—UV Curing System The description of the fabrication device 600 components illustrated in FIG. 6 having been completed, the operation and additional description of the inventor's embodiment apparatus, systems, and methods with a heater for heating the material supply will now be considered in greater detail. The jet forming device 602 includes a nozzle that produces the jet stream 604. FIG. 6 shows the encapsulation apparatus with jet stream 604 running along the direction of gravity. The material supply 612 feeds the material into the jet forming device 602. A heater 614 heats the material from material supply 612 before it is fed into the jet forming device 602. The vibration system 620 imparts vibration to the jet stream 604 that produces the droplets 606. The droplets 606 pass through the curing zone 608 where they are cured by the UV curing system 622. The cured droplets 606 are directed into the collection system 610. The operation of the fabrication device 600 is implemented and controlled by the computer controller 618.

Figure 7:
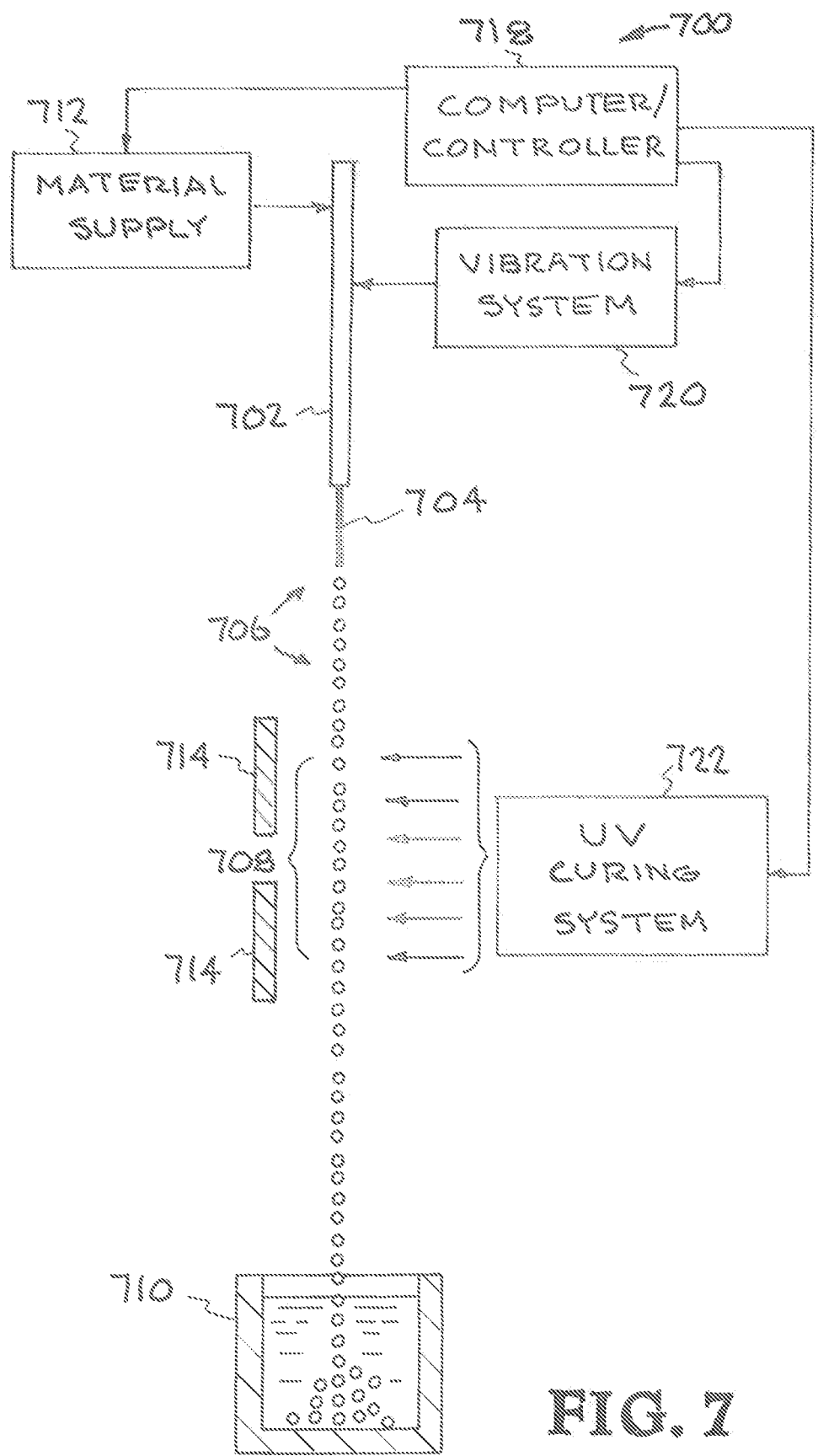
FIG. 7 illustrates an embodiment of the inventor's apparatus, systems, and methods that includes reflectors for reflecting the rays of UV Curing system back onto the droplets.

Referring now to FIG. 7, a simplified schematic depiction illustrates an embodiment of the inventor's apparatus, systems, and methods that includes reflectors for reflecting the rays of UV Curing system back onto the droplets. This embodiment is designated generally by the reference numeral 700. As illustrated, the embodiment 700 includes a number of components. The components of the inventor's apparatus, systems, and methods 700 illustrated in FIG. 7 are identified and described below.

Reference Numeral 700—Fabrication Device
Reference Numeral 702—Device
Reference Numeral 704—Fluid Jet
Reference Numeral 706—Droplets
Reference Numeral 708—Curing Zone
Reference Numeral 710—Collection System
Reference Numeral 712—Material Supply
Reference Numeral 714—Reflectors
Reference Numeral 718—Computer Controller
Reference Numeral 720—Vibration System
Reference Numeral 722—UV Curing System The description of the fabrication device 700 components illustrated in FIG. 7 having been completed, the operation and additional description of the inventor's embodiment apparatus, systems, and methods that includes reflectors for reflecting the rays of UV Curing system back onto the droplets will now be considered in greater detail. The jet forming device 702 includes a nozzle that produces the jet stream 704. FIG. 7 shows the encapsulation apparatus with jet stream 704 running along the direction of gravity. The material supply 712 feeds the material into the jet forming device 702. The vibration system 720 imparts vibration to the jet stream 704 that produces the droplets 706. The droplets 706 pass through the curing zone 708 where they are cured by the UV curing system 722. Reflectors 714 reflecting the rays of UV Curing system 722 back onto the droplets. The cured droplets 706 are directed into the collection system 710. The operation of the fabrication device 700 is implemented and controlled by the computer controller 718.

Figure 8:
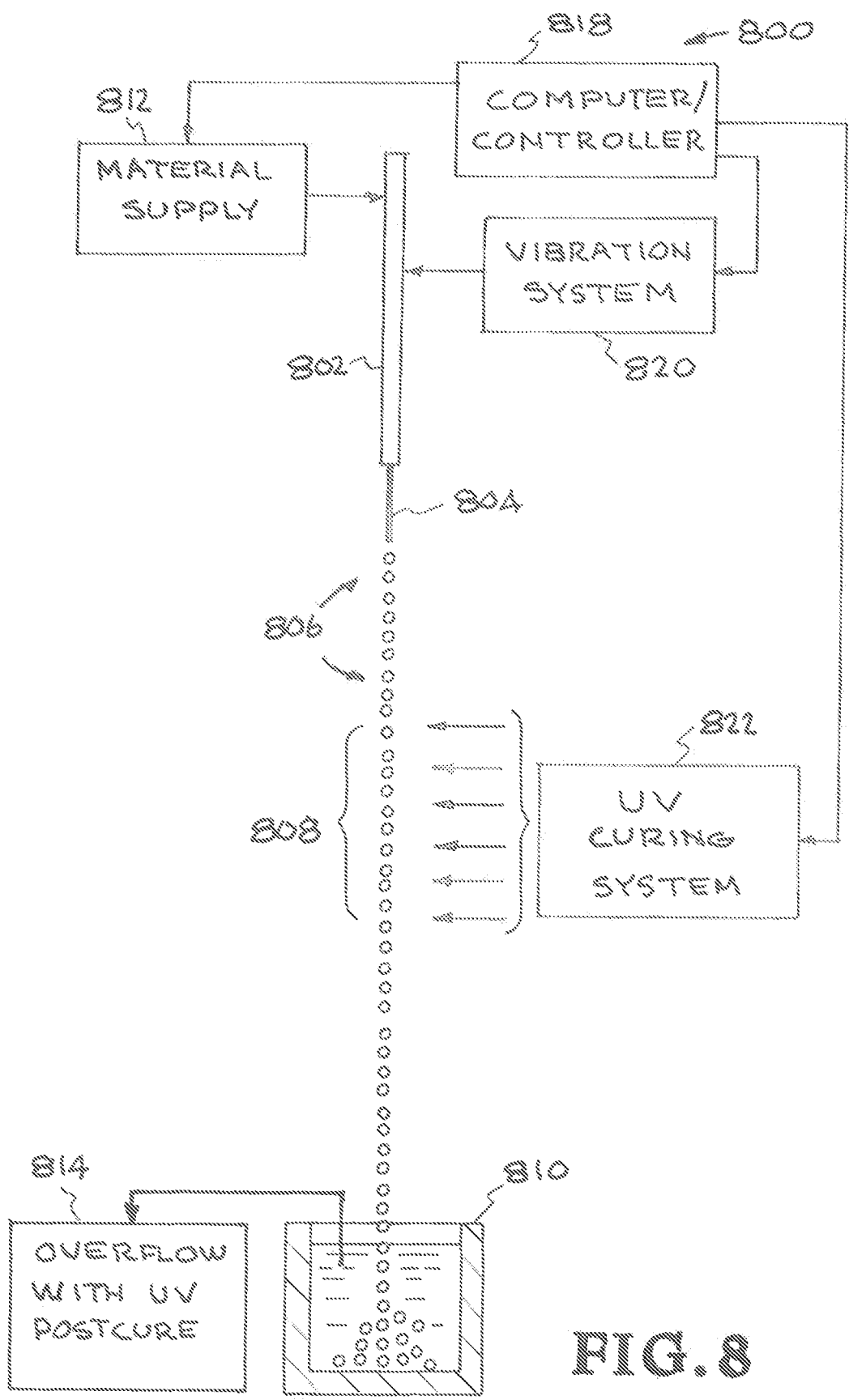
FIG. 8 illustrates an embodiment of the inventor's apparatus, systems, and methods that includes an overflow for collecting droplets that overflow from the collection system.

Referring now to FIG. 8, a simplified schematic depiction illustrates an embodiment of the inventor's apparatus, systems, and methods that includes an overflow for collecting droplets that overflow from the collection system. This embodiment is designated generally by the reference numeral 800. As illustrated, the embodiment 800 includes a number of components. The components of the inventor's apparatus, systems, and methods 800 illustrated in FIG. 8 are identified and described below.

Reference Numeral 800—Fabrication Device
Reference Numeral 802—Device
Reference Numeral 804—Fluid Jet
Reference Numeral 806—Droplets
Reference Numeral 808—Curing Zone
Reference Numeral 810—Collection System
Reference Numeral 812—Material Supply
Reference Numeral 814—Overflow With UV Postcure
Reference Numeral 818—Computer Controller
Reference Numeral 820—Vibration System
Reference Numeral 822—UV Curing System The description of the fabrication device 800 components illustrated in FIG. 8 having been completed, the operation and additional description of the inventor's embodiment apparatus, systems, and methods that includes an overflow for collecting droplets that overflow from the collection system will now be considered in greater detail. The jet forming device 802 includes a nozzle that produces the jet stream 804. FIG. 8 shows the encapsulation apparatus with jet stream 804 running along the direction of gravity. The material supply 812 feeds the material into the jet forming device 802. The vibration system 820 imparts vibration to the jet stream 804 that produces the droplets 806. The droplets 806 pass through the curing zone 808 where they are cured by the UV curing system 822. The cured droplets 806 are directed into the collection system 810. An overflow 814 collects droplets that overflow from the collection system. The operation of the fabrication device 800 is implemented and controlled by the computer controller 818.

Figure 9:
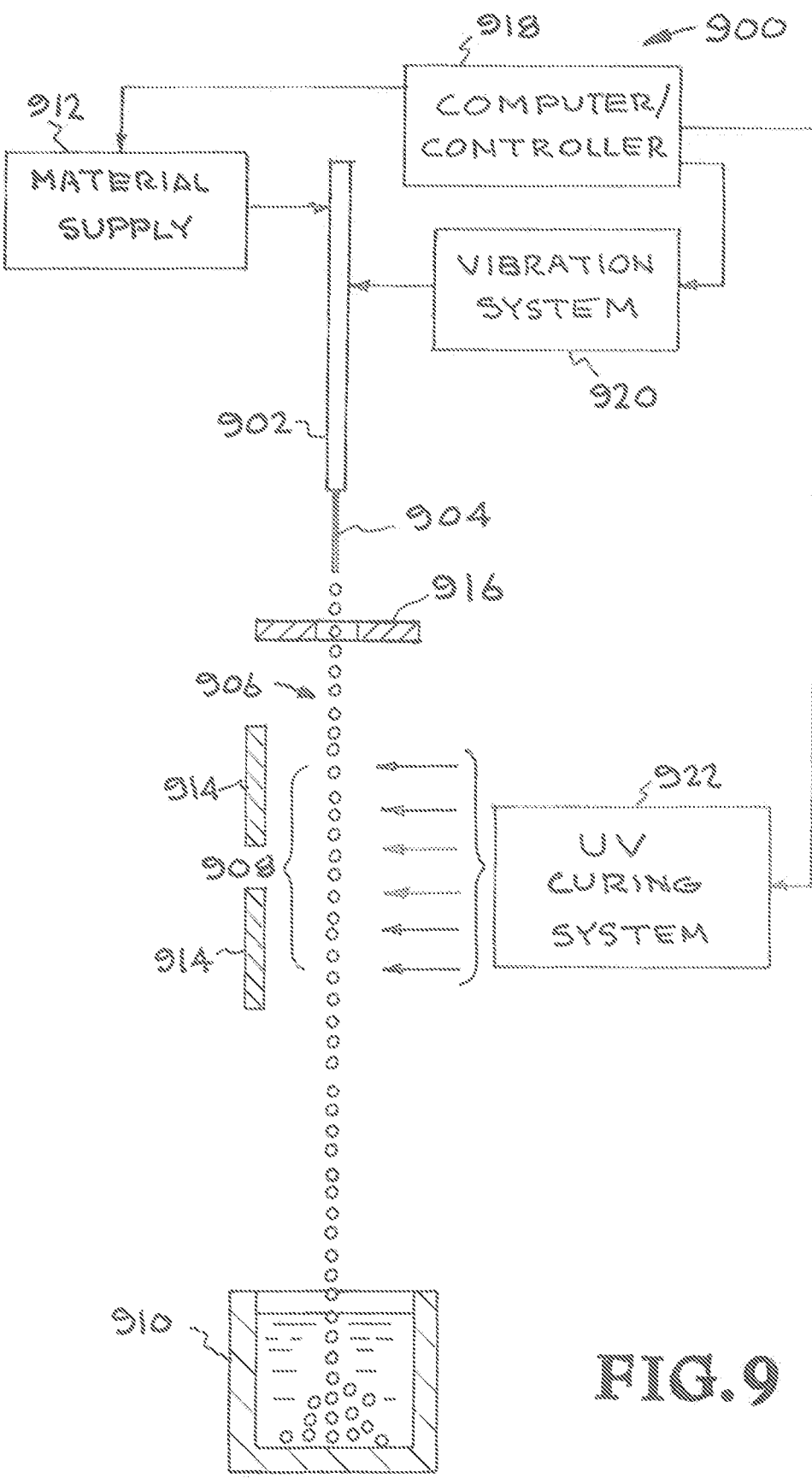
FIG. 9 illustrates an embodiment of the inventor's apparatus, systems, and methods that includes reflectors for reflecting the rays of UV Curing system back onto the droplets and a blocking device that prevents the UV rays from damaging components of the system.

Referring now to FIG. 9, a simplified schematic depiction illustrates an embodiment of the inventor's apparatus, systems, and methods that includes reflectors for reflecting the rays of UV Curing system back onto the droplets and a blocking device that prevents the UV rays from damaging components of the system. This embodiment is designated generally by the reference numeral 900. As illustrated, the embodiment 900 includes a number of components. The components of the inventor's apparatus, systems, and methods 900 illustrated in FIG. 9 are identified and described below.

Reference Numeral 900—Fabrication Device
Reference Numeral 902—Device
Reference Numeral 904—Fluid Jet
Reference Numeral 906—Droplets
Reference Numeral 908—Curing Zone
Reference Numeral 910—Collection System
Reference Numeral 912—Material Supply
Reference Numeral 914—Reflectors
Reference Numeral 916—Blocking System (IRIS)
Reference Numeral 918—Computer Controller
Reference Numeral 920—Vibration System
Reference Numeral 922—UV Curing System The description of the fabrication device 900 components illustrated in FIG. 9 having been completed, the operation and additional description of the inventor's embodiment apparatus, systems, and methods that includes reflectors for reflecting the rays of UV Curing system back onto the droplets and a blocking device that prevents the UV rays from damaging components of the system will now be considered in greater detail. The jet forming device 902 includes a nozzle that produces the jet stream 904. FIG. 9 shows the encapsulation apparatus with jet stream 904 running along the direction of gravity. The material supply 912 feeds the material into the jet forming device 902. The vibration system 920 imparts vibration to the jet stream 904 that produces the droplets 906. The droplets 906 pass through the curing zone 908 where they are cured by the UV curing system 922. Reflectors 914 reflecting the rays of UV Curing system 922 back onto the droplets. The blocking device 716 prevents the UV rays from damaging components of the system. The blocking device 716 can be an IRIS the is used in camera systems. The cured droplets 906 are directed into the collection system 910. The operation of the fabrication device 900 is implemented and controlled by the computer controller 918.

Figure 10:
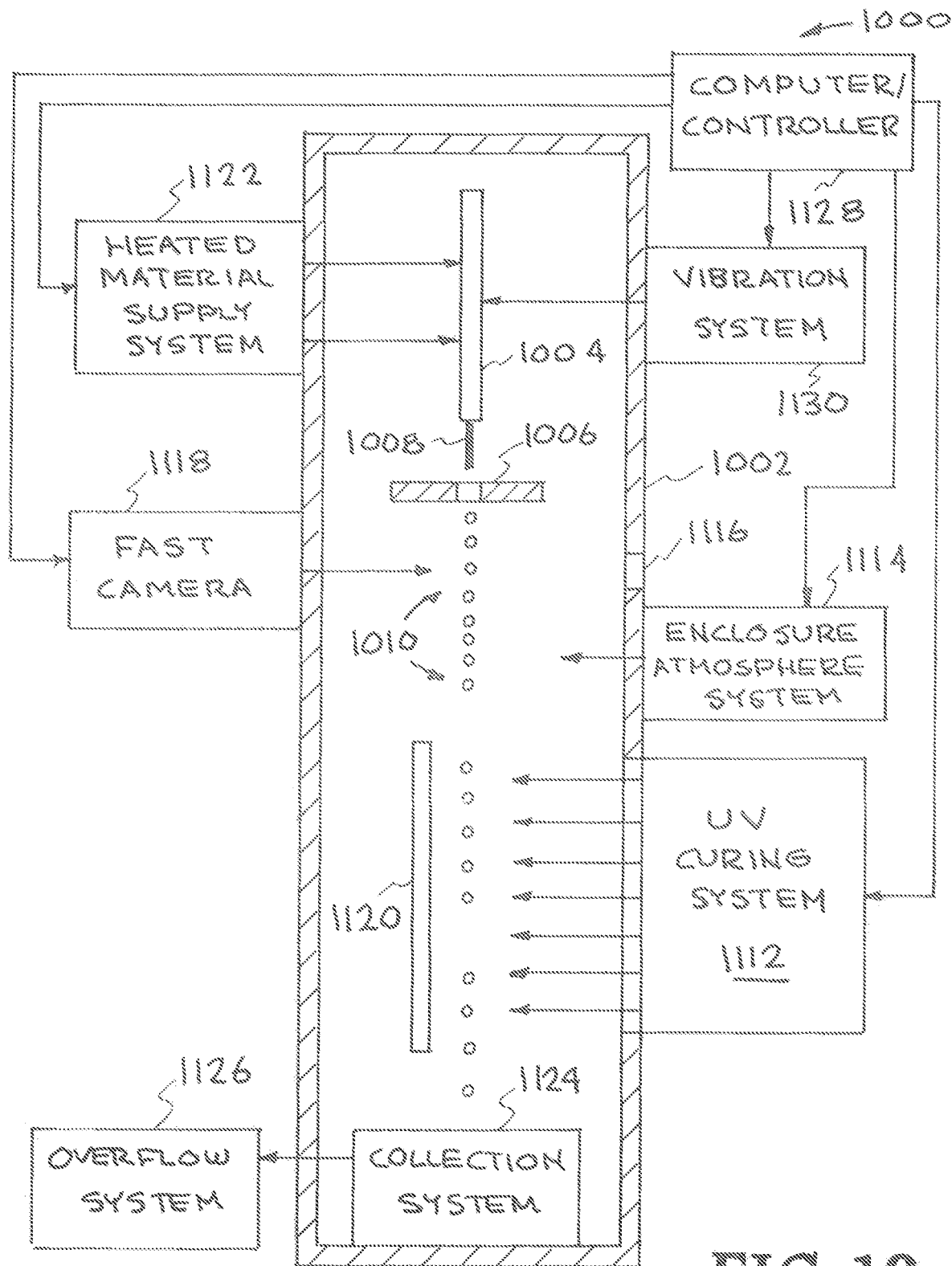
FIG. 10 illustrates another embodiment of the inventor's apparatus, systems, and methods for fabricating structured particles.

Referring now to FIG. 10, a simplified schematic depiction illustrates an embodiment of the inventor's apparatus, systems, and methods for fabricating structured particles. This embodiment is designated generally by the reference numeral 1000. As illustrated, the embodiment 1000 includes a number of components. The components of the inventor's apparatus, systems, and methods 1000 illustrated in FIG. 10 are identified and described below.

Reference Numeral 1000—Structured Particles Fabrication Device
Reference Numeral 1002—Enclosure
Reference Numeral 1004—Device for Producing a Fluid Jet
Reference Numeral 1006—IRIS
Reference Numeral 1008—Jet
Reference Numeral 1010—Droplets
Reference Numeral 1112—UV Curing System
Reference Numeral 1114—Enclosure Atmosphere System
Reference Numeral 1116—Window
Reference Numeral 1118—Camera
Reference Numeral 1120—Reflector
Reference Numeral 1122—Heated Material Supply
Reference Numeral 1124—Collection System
Reference Numeral 1126—Overflow System
Reference Numeral 1128—Computer/Controller
Reference Numeral 1130—Vibration System The description of the inventor's apparatus, systems, and methods for fabricating structured particles 1000 components illustrated in FIG. 10 having been completed, the operation and additional description of the inventor's embodiment apparatus, systems, and methods will now be considered in greater detail. An enclosure 1002 houses the apparatus, systems, and methods for fabricating structured particles 1000. An Enclosure Atmosphere System 1114 maintains the atmosphere inside the enclosure 1002. The Device for Producing a Fluid Jet 1004 provides a nozzle that produces the jet stream 1008. FIG. 10 shows the jet stream 1008 running along the direction of gravity. The heated material supply 1122 feeds the material into the jet forming device 1004. A heater heats the material in Heated Material Supply 1122 before it is fed into the jet forming device 1004. The vibration system 1130 imparts vibration to the jet stream 1008 that produces the droplets 1010. The droplets 1010 pass through the curing zone where they are cured by the UV Curing System 1112. A Reflector 1120 is positioned opposite the UV Curing System 1112 to reflect UV rays back onto the Droplets 1010. The IRIS 1006 prevents the UV rays from escaping the Enclosure 1002 and causing damage. The Fast Camera 1118 and Window 1116 provide light for photographing the formation of the Droplets 1010. The cured Droplets 1010 are directed into the Collection System 1024. An Overflow System 1126 allows the apparatus, systems, and methods for fabricating structured particles 1000 to continue operation even when the Collection System 1024 becomes full. The operation of the fabrication device 1000 is implemented and controlled by the Computer/Controller 1128.

The inventor's apparatus, systems, and methods for fabricating structured particles is further described and illustrated with reference to the drawing figures and as described below. Various changes and modifications of the examples will be apparent to those skilled in the art from the description of the examples and by practice of the invention. The scope of the invention is not intended to be limited to the particular examples disclosed and the invention covers all modifications, equivalents, and alternatives falling within the spirit and scope of the invention as defined by the claims.

The inventor's apparatus, systems, and methods for fabricating structured particles whole apparatus is installed inside an air-tight, sound-baffling and UV-blocking box. Cameras are set up outside the box through a viewing window for observation and characterization. Microfluidic device with co-axial nozzles are manufactured by using glass capillaries or stainless steel tubes. The diameters of the capillaries and tubes ranged from 5 µm to 10 mm and can be surface functionalized. Different fluids are pushed through connection pieces into the device to form a fluid jet and drops will form near the tip. Volumetric flow rates of the fluids are in the range of 1 ml/hr to 500 ml/hr for a single unit and multiplies proportionally when many units are parallelized.

The microfluidic chip can be operated as-is or with an external vibration source such as a contact speaker or piezo electric device). Negative tone photo-responsive resins to be used in this invention must be highly sensitive to the UV lamp, and contain multifunctional cross-linking monomers. Multifunctionality enables high curing rates to obtain high chemical conversions during the residence time when drops are exposed to UV. The photoinitiator compound utilized must have an absorbance peak maximum at the lamp wavelength for effective curing. Inhibitor species are to be used minimally for maintaining uncured resin stability in the syringe, tubing and device prior to exiting the device capillary. Polymer drops are cured or partially-cured before collected and post-curing can be performed for full cross-linking. During operation, an inert gas environment can be utilized for formulations composed of oxygen inhibited monomers (such as those containing acrylate species). An oxygen-free environment minimizes the induction period, providing instantaneously fast reaction speeds once the resin droplet falls within the UV exposure window. UV lamps can be stacked or used from different sides to facilitate the crosslinking of the polymer drops. In addition, polymer used in drop generation can be obtained through thermal setting, solvent extraction or a combination of these.

After the particles get crosslinked, they can be collected in a container or in a liquid bath. Options of the liquid bath are solvents with a density in the range of 0.7-1.5 g/ml and surface tension in the range of 8-100 mN/m. Examples are: liquid nitrogen, isopropanol, toluene, and water-based mixtures. The fluids can be still, stirred or shaken in motion. In addition, the fabricated particles can also be collected with the aid of air flow. Air flow can come from the bottom of the container to slow down the speed of the incoming drops to reduce capsule breakage. In this case, the top rim of the collection container will extend to the device level and is composed of UV permeable material such as quartz. The air flow is distributed evenly from the bottom of the container to counteract the falling particles and soften the impact during collection. Furthermore, air flow can also be used to divert the direction of the falling particles by blowing sideways. In this case, particles will be collected in a container not directly underneath the fabrication device. Alternatively, the drop generation apparatus can be operated at different angles and the collection bath can be placed at different locations. For example, the nozzle can face upwards at an angle. This increases the residence time of the capsules through the UV exposure window. This also decreases the capsule speed when they are collected for reduced impact that could cause bursting of the shell. Capsules can also be collected onto a slope near the apex of trajectory, transiting them into a moderate collection path. The slope can be surface treated with non-stick coating (i.e. Teflon) or covered with a layer of rinsing fluid which will be distributed from the end near the incoming particles. A UV lamp could also be placed near the slope for improved UV crosslinking.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

The invention claimed is:

1. A method of fabricating structured particles, comprising:
providing an enclosure,
providing a fluid jet forming unit adapted to produce a fluid jet stream located in said enclosure;
supplying a material to said fluid jet forming unit wherein said fluid jet stream is made of said material;
using said fluid jet forming unit to produce said fluid jet stream;
providing a vibration system in said enclosure positioned proximate said fluid jet stream wherein said vibration unit is adapted to impart vibration to said fluid jet stream;
using said vibration system to impart vibration to said fluid jet stream and produce a particle fluid jet stream having discrete droplets wherein said droplets are made of said material;
providing an iris in said enclosure wherein said particle fluid jet stream passes through said iris;
providing a curing system positioned outside said enclosure that directs ultraviolet rays onto said particle fluid jet stream wherein said curing system is adapted to cure said discrete droplets;
using said curing system to cure said discrete droplets and produce cured droplets;
providing a collection system in said enclosure adapted to receive said cured droplets; and
using said collection system for receiving said cured droplets thereby providing the structured particles.

2. The method of fabricating structured particles of claim 1 further comprising the step of
providing a reflector in said enclosure proximate said particle fluid jet stream.

3. The method of fabricating structured particles of claim 1 wherein said material is comprised of a first component and a second component.

4. The method of fabricating structured particles of claim 3 wherein said discrete droplets are made of an internal core of said first component and a shell made of said second component and wherein said shell made of said second component completely surrounds said internal core of said first component.

5. The method of fabricating structured particles of claim 1 wherein said material is comprised of a first component, a second component, and a third component.

6. The method of fabricating structured particles of claim 5 wherein said discrete droplets are made of an internal core of said first component, a shell made of said second component wherein said shell made of said second component completely surrounds said internal core of said first component, and a second shell made of said third component wherein said second shell made of said third component completely surrounds said internal core of said first component and said shell made of said second component.

7. The method of fabricating structured particles of claim 1 wherein said fluid jet stream and said particle fluid jet stream are affected by gravity having a direction of gravity and wherein said fluid jet stream and said particle fluid jet stream are positioned running in said direction of gravity.

8. The method of fabricating structured particles of claim 1 further comprising the steps of
providing a window in said enclosure and
positioning a camera outside of said enclosure facing said window.

9. The method of fabricating structured particles of claim 1 wherein said fluid jet stream and said particle fluid jet stream are affected by gravity having a direction of gravity and wherein said fluid jet stream and said particle fluid jet stream are positioned running at an angle against said direction of gravity further comprising the step of providing an overflow system outside of said enclosure for receiving said cured droplets.

10. The method of fabricating structured particles of claim 1 further comprising a step of hardening said droplets.

\* \* \* \* \*